United States Patent
Bhargavi et al.

(10) Patent No.: US 12,041,278 B1
(45) Date of Patent: Jul. 16, 2024

(54) COMPUTER-IMPLEMENTED METHODS OF AN AUTOMATED FRAMEWORK FOR VIRTUAL PRODUCT PLACEMENT IN VIDEO FRAMES

(71) Applicant: Amazon Technologies, Inc., Seattle, WA (US)

(72) Inventors: V Divya Bhargavi, Sunnyvale, CA (US); Karan Sindwani, Sunnyvale, CA (US); Siavash Gholami, Fremont, CA (US); Xiaohan Nie, Lynnwood, WA (US); Ahmed Aly Saad Ahmed, Bothell, WA (US); David Kuo, Arcadia, CA (US); Yash Chaturvedi, Issaquah, WA (US); Vidya Sagar Ravipati, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/853,720

(22) Filed: Jun. 29, 2022

(51) Int. Cl.
  *H04N 21/234* (2011.01)
  *H04N 21/25* (2011.01)
  *H04N 21/81* (2011.01)

(52) U.S. Cl.
  CPC ..... *H04N 21/23424* (2013.01); *H04N 21/251* (2013.01); *H04N 21/812* (2013.01)

(58) Field of Classification Search
  CPC ........... H04N 21/23424; H04N 21/251; H04N 21/812; H04N 21/23418; H04N 21/4316;
  (Continued)

(56) References Cited

U.S. PATENT DOCUMENTS 8,910,201 B1* 12/2014 Zamiska ............. H04N 21/458 725/60
2002/0063807 A1* 5/2002 Margulis .................. G06T 1/20 348/745

(Continued)

OTHER PUBLICATIONS

Amazon Rekognition, "Machine Learning Image and Video Analysis", Amazon Web Services, Retrieved from <https://aws.amazon.com/rekognition/>, Retrieved on Jun. 22, 2022, 13 pages.

(Continued)

*Primary Examiner* — Cynthia M Fogg
(74) *Attorney, Agent, or Firm* — NICHOLSON DE VOS WEBSTER & ELLIOTT LLP

(57) ABSTRACT

Techniques for a computer-implemented service for virtual product placement in video frames are described. According to some embodiments, a computer-implemented method includes receiving, at a virtual product placement service, a request to place a two-dimensional image of a virtual product into a video, identifying, by a machine learning model of the virtual product placement service, a surface depicted in the video for insertion of the two-dimensional image of the virtual product, inserting, by the virtual product placement service, of the two-dimensional image of the virtual product into one or more frames of the video onto the surface to generate a video including the virtual product, and transmitting the video including the virtual product to a viewer device or a storage location.

20 Claims, 29 Drawing Sheets
(20 of 29 Drawing Sheet(s) Filed in Color)

(58) Field of Classification Search
CPC ............. H04N 21/8146; H04N 5/2723; H04N 21/44008
USPC .......................................................... 725/32
See application file for complete search history.

(56) References Cited

U.S. PATENT DOCUMENTS

| | | | | |
|---|---|---|---|---|
| 2003/0028432 | A1* | 2/2003 | Troyansky | G06Q 30/02 705/14.66 |
| 2008/0012988 | A1* | 1/2008 | Baharav | H04N 21/254 375/E7.006 |
| 2015/0071613 | A1* | 3/2015 | Dharssi | H04N 21/85 386/278 |
| 2015/0199995 | A1* | 7/2015 | Silverstein | G11B 27/036 386/249 |
| 2016/0117722 | A1* | 4/2016 | Garcia | G06Q 30/0251 705/14.49 |
| 2016/0182971 | A1* | 6/2016 | Ortiz | G06F 3/0484 725/34 |
| 2018/0013977 | A1* | 1/2018 | Martineau | G06V 10/255 |
| 2018/0192160 | A1* | 7/2018 | Ravindran | H04N 21/23418 |
| 2019/0075339 | A1* | 3/2019 | Smith | H04N 21/25883 |
| 2021/0011960 | A1* | 1/2021 | Chambon-Cartier | G06V 10/25 |
| 2021/0117685 | A1* | 4/2021 | Sureshkumar | H04N 21/812 |
| 2021/0127181 | A1* | 4/2021 | Ramot | H04N 21/23439 |
| 2021/0201956 | A1* | 7/2021 | Stephens | G06T 19/20 |
| 2021/0321170 | A1* | 10/2021 | MacDougall | H04N 21/44222 |
| 2022/0021921 | A1* | 1/2022 | Osman | H04N 21/2743 |
| 2022/0180898 | A1* | 6/2022 | Ahmed | H04N 21/84 |

OTHER PUBLICATIONS

Barath et al., "MAGSAC++, a fast, reliable and accurate robust estimator", Proceedings of the IEEE/CVF Conference on Computer Vision and Pattern Recognition (CVPR), Jun. 2020, 10 pages.

Bian et al., "GMS: Grid-based Motion Statistics for Fast, Ultra-robust Feature Correspondence (CVPR 17 & IJCV 20)", GitHub, GMS-Feature-Matcher, Retrieved from <https://github.com/JiawangBian/GMS-Feature-Matcher>, Retrieved on Jun. 22, 2022, 5 pages.

Bian et al., "GMS: Grid-based Motion Statistics for Fast, Ultra-robust Feature Correspondence", Proceedings of the IEEE Conference on Computer Vision and Pattern Recognition (CVPR), 2017, pp. 4181-4190.

Creswell et al., "Generative Adversarial Networks: An Overview", IEEE Signal Processing Magazine, vol. 35, No. 1, Apr. 2018, pp. 1-14.

Detone et al., "SuperPoint: Self-Supervised Interest Point Detection and Description", Proceedings of the IEEE Conference on Computer Vision and Pattern Recognition (CVPR) Workshops, Jun. 2018, pp. 337-349.

Github, "Detectron2 Model Zoo and Baselines," Retrieved from <https://github.com/facebookresearch/detectron2/blob/main/MODEL_ZOO.md>, Retrieved on Jun. 22, 2022, 10 pages.

Gonzalez et al., "Digital Image Processing", Third Edition, Chapter 3, Pearson Education, 2002, 11 pages.

Magicleap, "Super Point Pretrained Network", Retrieved from <https://github.com/magicleap/SuperPretrainedNetwork>, Retrieved on Jun. 22, 2022, 6 pages.

OpenCV, "Histogram Equalization", Retrieved from <https://docs.opencv.org/3.4.15/d4/d1b/tutorial_histogram_equalization.html>, Retrieved on Jun. 22, 2022, 4 pages.

Pengpeng, Zhu, "Human image segmentation image", The dataset of segmentation picture consist of training and testing, Available Online at <https://www.kaggle.com/datasets/zhupengpeng/segofpic?resource=download>, 2021, 3 pages.

PyTorch, "Kornia," Open Source and Computer Vision, Retrieved from <https://kornia.readthedocs.io/en/latest/>, Retrieved on Jun. 22, 2022, 2 pages.

Reinhard et al., "Color Transfer between Images", IEEE Computer Graphics and Applications, vol. 21, No. 5, Sep./Oct. 2001, pp. 34-41.

Scikit-Image: Image processing in python, "Module: measure—skimage v0.20.0.dev0 docs", Retrieved from <https://scikit-image.org/docs/dev/api/skimage.measure.html#skimage.measure.regionprops>, Retrieved on Jun. 22, 2022, 42 pages.

Shen et al., "Deep Automatic Portrait Matting", European Conference on Computer Vision ECCV 2016: Computer Vision, Part I, LNCS 9905, 2016, pp. 92-107.

Svip-Lab, "PlanarReconstruction", GitHub, Retrieved from <https://github.com/svip-lab/PlanarReconstruction>, Retrieved on Jun. 22, 2022, 4 pages.

Szeliski, Richard, "Computer Vision: Algorithms and Applications", 2nd Edition, Final draft, Sep. 30, 2021, pp. 14 pages.

XinzeLee, "Polygon Object Detection", Retrieved from <https://github.com/XinzeLee/PolygonObjectDetection>, Retrieved on Jun. 22, 2022, 12 pages.

Xu et al., "LETR: Line Segment Detection Using Transformers Without Edges", GitHub, CVPR 2021 Oral, Retrieved from <https://github.com/mlpc-ucsd/LETR>, Retrieved on Jun. 22, 2022, 5 pages.

Xu et al., "Line Segment Detection Using Transformers Without Edges", Proceedings of the IEEE/CVF Conference on Computer Vision and Pattern Recognition (CVPR), 2021, pp. 4257-4266.

Yu et al., "Single-Image Piece-wise Planar 3D Reconstruction via Associative Embedding", Proceedings of the IEEE/CVF Conference on Computer Vision and Pattern Recognition (CVPR), 2019, pp. 1-14.

\* cited by examiner

COMPUTER-IMPLEMENTED METHODS OF AN AUTOMATED FRAMEWORK FOR VIRTUAL PRODUCT PLACEMENT IN VIDEO FRAMES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various embodiments in accordance with the present disclosure will be described with reference to the following drawings.

DETAILED DESCRIPTION

Figure 1:
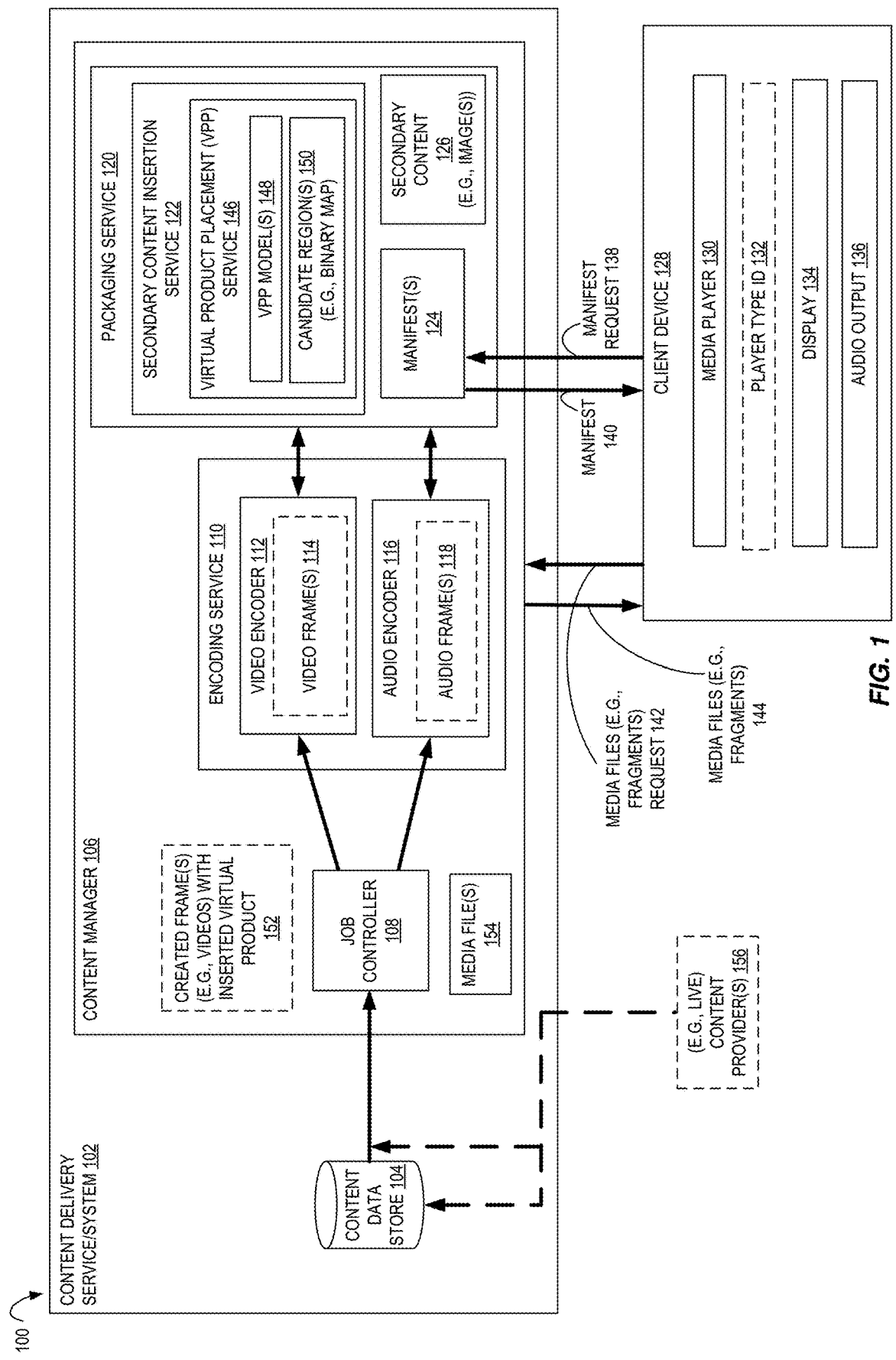
FIG. 1 is a diagram illustrating an environment including a content delivery service/system having a packaging service to implement a virtual product placement (VPP) service according to some embodiments.

The present disclosure relates to methods, apparatus, systems, and non-transitory computer-readable storage media for virtual product placement in video frames. Certain embodiments herein are directed to a computer-implemented service that utilizes a machine learning model to identify one or more (e.g., planar) regions (e.g., surfaces) for insertion of an image (e.g., two-dimensional image of a two-dimensional object or a three-dimensional object) into a video, e.g., a plurality of frames of the video. Product placement is an advertising technique of placing an object (e.g., branded object) into the scene of a video (e.g., movie or television show), such as inserting a certain brand of soda cans and/or digitally inserting logo(s) on drinking containers (e.g., mugs) in a video. This type of advertising provides the ability for brands to reach consumers without interrupting the viewing experience with a commercial break, e.g., the products are seen in the background and/or as props.

Instead of a product (e.g., physical item) being physically on location (e.g., the "set") of a videoed event, certain embodiments herein allow for a virtualized product (e.g., an image of a product that was not physically present in the video when it was captured as video) to be inserted into the videoed event. However, both content creators and marketers (e.g., advertisers) carry risk in performing virtual product placement manually (by a visual effects (VFX) vendor in a post-production setting) as the existing placement market due to the agreements may be negotiated months, or years, ahead of time. For marketers, this means the video (e.g., title) can under-perform in attracting the desired audience, placements can become stale over time as the content may not be viewed more than once, and the inserted product may lose its relevancy with the audience as the title ages. On the content side, the creator is locked into a limited number of placements, can have production schedules impacted by marketers' placement requests, and has no ability to update the title once it enters distribution. As a result, there is no recurring placement revenue stream, and the content can become tied to the products placed, even if those items end up not resonating with the audience.

Instead of finding the best location manually (e.g., by a visual effects (VFX) vendor in a post-production setting), embodiments herein are directed to an automated framework for virtual product placement in video. Embodiments herein are directed to fully automated computer vision pipeline which places a two-dimensional (2D) image (e.g., an advertising image) of a virtual product in a video in a realistic, non-intrusive way, e.g., and renders the image with natural lighting in the scene and/or handles occlusion from moving objects (e.g., foreground objects) to create a better viewing experience. Embodiments herein automate the virtual placement of products into a video, e.g., the playback stream. Embodiments herein enables advertisers to tailor the product being placed in a video for the audience's specific taste. Additionally, this allows content creators to globally resell placement multiple times over the same video, without impacting the storytelling or viewing experience.

Embodiments herein are directed to a virtual product placement (VPP) service that includes one or more of the following services (e.g., modules) for enabling (e.g., real-time) product placement: (1) identifying a suitable placement location, for example, identifying empty space in a video (e.g., on a wall) (e.g., in a cooking show), e.g., and this may include scene identification (e.g., as a sub-task of identifying suitable space), e.g., in addition to identifying just a suitable space in an image, in certain embodiments the VPP pipeline is to discern if the frame being captured is within a relevant scene (e.g., within a kitchen for a cooking show), (2) virtual product (e.g., advertisement) overlay, e.g., identifying the 2D (or three-dimensional (3D)) geometry of the scene for visually consistent product placement, (3) ambient lighting, e.g., matching the light (e.g., perception of lighting) of an advertisement image (e.g., virtual product image) to a background, (4) occlusion handling, e.g., identifying foreground and background in a scene, and intelligently masking occlusion due to movement of objects (e.g., things, such as, but not limited to, people) around in the 3D world, (5) virtual product rendering and/or tracking, e.g., per-frame localization of product location for consistent placement and tracking across video, or any one or combination thereof.

Embodiments herein may be utilized in various types of videos. For example, (i) linear TV that is a program that can be viewed according to a set schedule, much like traditional TV, (ii). video on demand (VOD) that can be viewed at any time (e.g., at a user's convenience and schedule), or (iii), live streaming events that are taking place as they are viewed (e.g., sporting events). These events may be recorded and be watched later as well. An example use discussed herein is product placement in a cooking show, but it should be understood that the apparatuses and methods herein may be utilized with other types of shows.

Embodiment herein are directed to computer-implemented (e.g., not human and not with pen-and-paper) virtual product placement region detection in digital entertainment content video frames. Embodiments herein improve the functioning of a computer-implemented service by utilizing a machine learning model to identify a region (e.g., surface) for insertion of a virtual product (e.g., a 2D image of a virtual product) in a video frame.

FIG. 1 is a diagram illustrating an environment 100 including a content delivery service/system 102 having a packaging service 120 to implement a virtual product placement (VPP) service 146 according to some embodiments.

The depicted content delivery service/system 102 includes a content data store 104, which may be implemented in one or more data centers. As one example, a media file (e.g., including a video file and audio file) (e.g., a media container) that is to be encoded is accessed from the content data store 104 by content manager 106. The media file may be uploaded to content data store 104 by content provider(s) 156 or provided directly (e.g., as live content) to content manager 106 by content provider(s) 156 (e.g., from a live content encoder).

In certain embodiments, the content manager 106 includes a job controller 108 to control each encoding job. In certain embodiments, job controller 108 controls the encoding (e.g., transcoding) of a media file into packages and files in various formats and in different sizes for distribution to end users (e.g., viewers). In certain embodiments, a user (e.g., separate from an end user or client) creates a job for a (e.g., uncompressed) multimedia file from content data store 104 by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain embodiments, to set up a job in job controller 108, a user specifies the input files (e.g., from content data store 104) for the service to encode (e.g., transcode from one format to a different format), for example, by specifying the source for each video, audio, and/or captions media element. That source might be a specific part of a primary input file, or it might be a separate file. In certain embodiments, to set up a job in job controller 108, a user specifies the types of output files (e.g., and packages) that are to be generated from the input. In certain embodiments, to set up a job in job controller 108, a user specifies the encoding settings to produce the quality and type of output that is desired.

In certain embodiments, the encoding service 110 is to encode the media file (e.g., video file and corresponding audio file) into a plurality of video and audio representations (e.g., streams). In FIG. 1, video encoder 112 is to receive an input of a video file and create video frame(s) 114 from that video file, e.g., for a video frame and/or fragment duration. In FIG. 1, audio encoder 116 is to receive an input of an audio file and create audio frame(s) 118 (e.g., a number of audio samples within each frame) for that audio file, e.g., at an audio frame and/or fragment duration. In certain embodiments, packaging service 120 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 110 may include a plurality of instances of video encoder 112 and audio encoder 116, e.g., to process multiple inputs in parallel. In certain embodiments, In certain embodiments, packaging service 120 includes one or more manifests 124, e.g., identifying the media file(s) 154 (e.g., fragments, streams, etc.). In certain embodiments, a manifest for a particular media file (e.g., a particular title) identifies a proper subset of video and audio representations of the media file for a particular client device 128 (e.g., based on the client's media player 130 (e.g., determined from its type ID value 132), display 134 resolution, audio output 136 capabilities, and/or available bandwidth). In certain embodiments, the content is stored in the content delivery service/system 102 in two parts: (i) the manifest 124 of all available media representations (e.g., their URL addresses and, optionally, other characteristics) and (ii) the media files 154 (e.g., representations) (e.g., stream of fragments) in a single (e.g., container) or multiple files. In certain embodiments, a client device 128 is to read (or store) a manifest 140 (e.g., sent in response to manifest request 138) before the client device may make a request 142 for the media from that manifest, and thus access media files 144 (e.g., audio fragments and corresponding video fragments) from media file 154 storage.

In certain embodiments, secondary content insertion service 122 adds secondary content (e.g., advertisement(s)) into a main content. In certain embodiments, encoding service 110 is to encode both the main content and secondary content, e.g., and the secondary content insertion service 122 is to insert the secondary content into the main content.

In certain embodiments, the secondary content insertion service 122 includes a virtual product placement (VPP) service 146, e.g., to generate one or more candidate (e.g., empty) regions 150 (e.g., binary map) as discussed herein. In certain embodiments, the VPP service 146 utilizes one of more VPP machine learning models 148, e.g., to generate one or more candidate region(s) 150.

In certain embodiments, the VPP service 146 is separate from the packaging service 120, e.g., in embodiments where the VPP service 146 (e.g., as part of content manager 106 services/system) is used to generate images that are not frames. In certain embodiments, the VPP service 146 outputs an indication of a candidate region(s) 150 and the content manager 106 generates frames 152 based at least in part on the indication of a candidate region(s) 150. In certain embodiments, the VPP service 146 outputs an indication of a candidate region(s) 150 and the content manager 106 (e.g., secondary content insertion service 122 thereof) inserts secondary content 126 (e.g., images of products, logos, subtitles, etc.) based at least in part on the indication of a candidate region(s) 150. In certain embodiments, a video (e.g., frame) with its secondary content 126 inserted into the video is then encoded, e.g., and the resulting output is a media file 154, e.g., with the frame with secondary content (e.g., a virtual product) displayed on display 134. Example machine learning models 148, e.g., an ensemble of machine learning models, are discussed further below.

Figure 2:
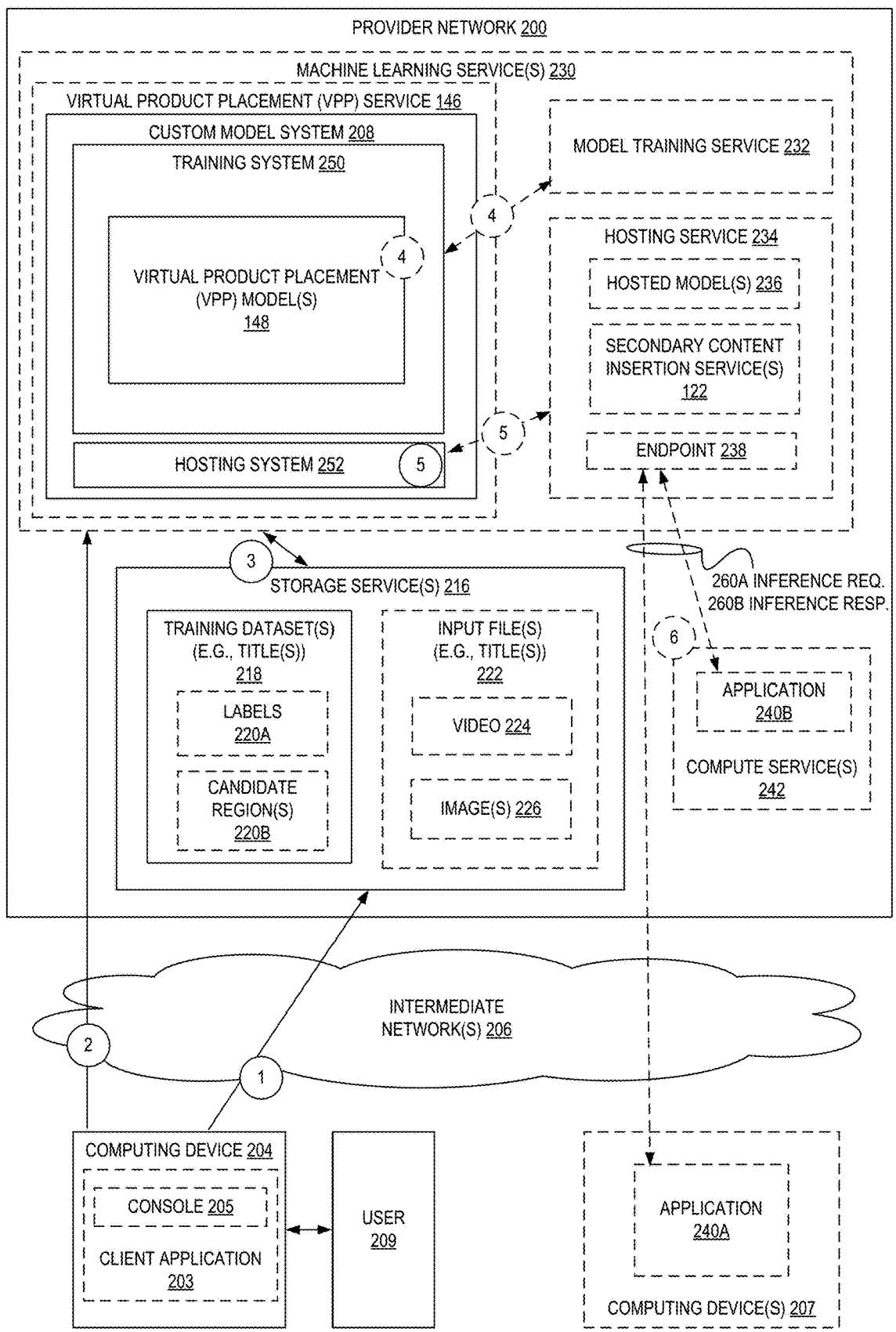
FIG. 2 is a diagram illustrating an environment for creating, training, and using one or more machine learning models according to some embodiments.

FIG. 2 is a diagram illustrating an environment for creating, training, and using one or more machine learning models 148 according to some embodiments. FIG. 2 includes a virtual product placement (VPP) service 146, one or more storage services 216, one or more machine learning services 230, and one or more compute services 242 implemented within a multi-tenant provider network 200. Each of the virtual product placement (VPP) service 146, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The virtual product placement (VPP) service 146, in some embodiments, is a machine learning powered service that makes it easy for users (e.g., content providers and/or advertisers) to identify a region (e.g., surface) for insertion of a virtual product (e.g., a 2D image of a virtual product) in a video frame.

The training system 250, for example, may enable users to generate one or more machine learning models (e.g., FCS machine learning model(s) 148) that output results (e.g., an indication of a candidate region(s)) for an input (for example, of a video 224 and/or images 226, e.g., from input file(s) 222). In certain embodiments, the training system 250 enables users to generate a VPP model 148 that outputs a value or other indication for each pixel, such that they cumulatively (e.g., logically) form a two-dimensional per pixel map that indicates a (e.g., best) region (e.g., surface) for insertion of a virtual product (e.g., a 2D image of a virtual product) in a video frame (e.g., or a plurality of video frames) from an input of a file 222 (e.g., a frame of video 224).

Embodiments herein allow a customer to create one or more machine learning models 148 by supplying a training dataset 218 (for example, including labels 220A, e.g., labels that indicate if a training image/frame includes a (e.g., best) candidate region (e.g., surface) for insertion of a virtual product and/or indication of a candidate region(s)(s) 220B used for training).

In some embodiments, the virtual product placement (VPP) service 146—via use of a custom model system 208—allows users to build and use model(s) 148.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into FCS machine learning model 148, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220A and/or indication of a candidate region(s)s 220B) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 146 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 148, this file (or files) may include labels corresponding to the file (e.g., video, audio, and/or text), e.g., with a label indicating category(ies) of content in the file.

Thereafter, at circle (2) the computing device 204 may issue one or more requests (e.g., API calls) to the machine learning service 230 that indicate the user's 209 desire to train one or more algorithms into model(s), e.g., into an FCS machine learning model 148. The request may be of a type that identifies which type of model(s) are to be created or identifies that the machine learning service 230 itself is to identify the candidate model(s), e.g., candidate FCS machine learning model 148. The request may also include one or more of an identifier of a storage location or locations storing the data 218 (e.g., an identifier of the labels 220A and/or indication of a candidate region(s)s 220B), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220A, etc. In some embodiments, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220A and/or indication of a candidate region(s)s 220B), etc. Thus, the custom model system 208 may retrieve any stored data 218 elements as shown at circle (3), which may be from a storage location within the provider network 200 or external to the provider network 200.

In some embodiments, the training (at dotted circle (4)) of model(s) 148, includes performing (at optional, dotted circle (4)) by training service 232 of machine learning service 230 a particular training job (e.g., hyperparameter optimization tuning job), or the like.

In some embodiments, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (6), provide the inference requests 260A to the associated hosted model(s) 236, and provide inference results 260B (e.g., a prediction, including, but not limited to, a (e.g., per pixel) indication of a candidate region(s)) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain embodiments, the inference results are utilized by secondary content insertion service(s) 122 to insert secondary content (e.g., an image of a virtual product) into the input file 222 based at least in part on the inference results of a per pixel relevance (e.g., empty) indication of a candidate region(s).

Figure 3:
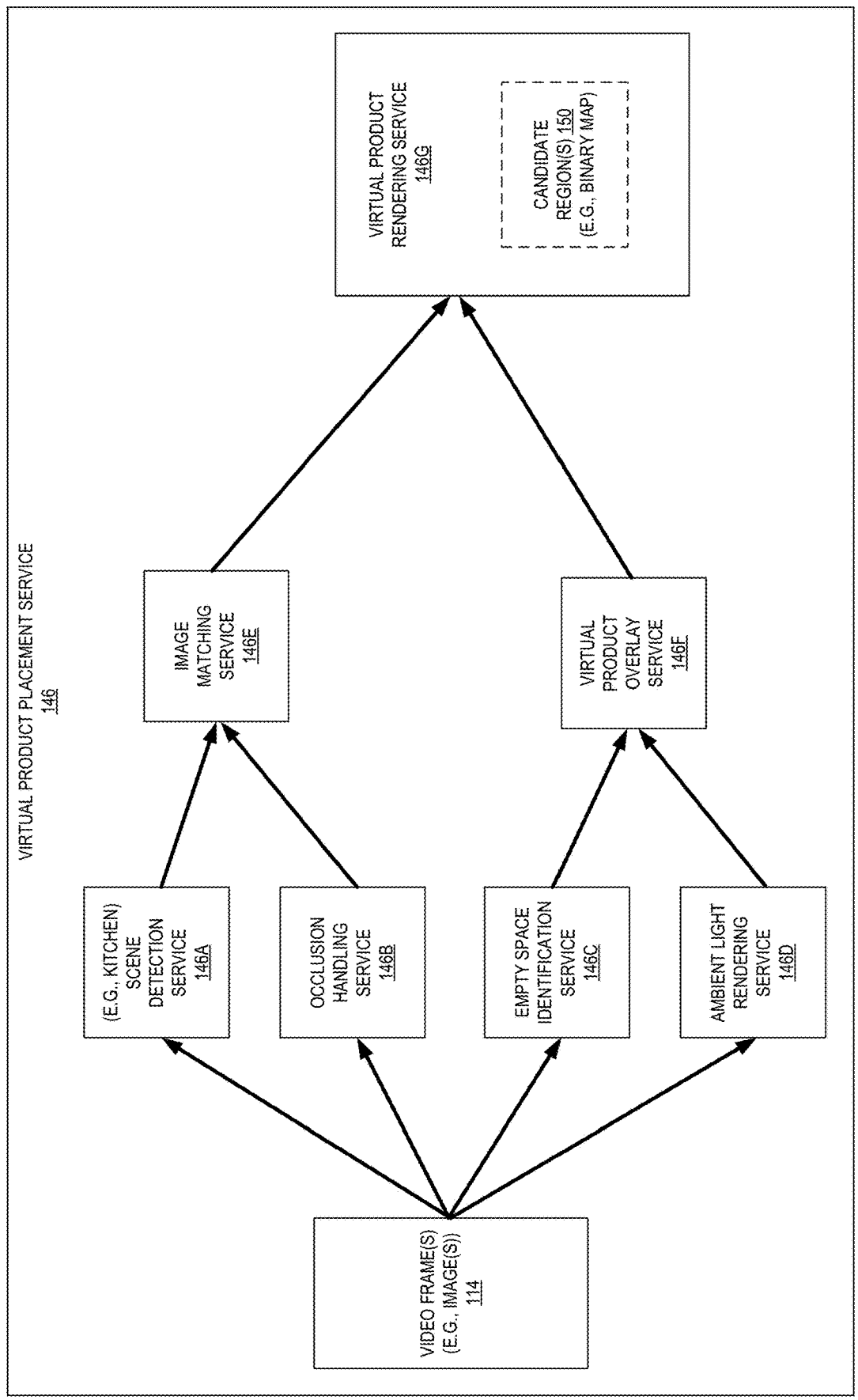
FIG. 3 is a diagram illustrating a virtual product placement (VPP) service according to some embodiments.

FIG. 3 is a diagram illustrating a virtual product placement (VPP) service 146 according to some embodiments. In certain embodiments, one or more video frame(s) 114 is input into VPP service 146 and a resulting output indicates candidate region (e.g., surface(s)) for insertion of a virtual product.

In certain embodiments, VPP service includes one or more of the following services (e.g., modules) for enabling (e.g., real-time) product placement: (1) empty space identification service 146C for identifying a suitable placement location, for example, identifying empty space in a video (e.g., on a wall) (e.g., in a cooking show), e.g., and this may include scene detection service 146A to determine if the frame being captured is within a relevant scene (e.g., within a kitchen for a cooking show, etc.), (2) virtual product (e.g., advertisement) overlay service 146F, e.g., identifying the 2D (or three-dimensional (3D)) geometry of the scene for visually consistent product placement, (3) ambient light rendering service 146D, e.g., matching the light (e.g., perception of lighting) of an advertisement image (e.g., virtual product image) to a background, (4) occlusion handling service 146B, e.g., identifying foreground and background in a scene, and intelligently masking occlusion due to movement of objects (e.g., things, such as, but not limited to, people) around in the 3D world, (5) virtual product rendering (and/or tracking) service 146G, e.g., per-frame localization of product location for consistent placement and tracking across video, (6) image matching service 146E, or any one or combination thereof.

In certain embodiments, a VPP service (e.g., VPP service 146) includes an automated (e.g., computer vision (CV) based) pipeline which identifies a suitable location for product image (e.g., an advertising image) insertion, places the image (e.g., object) in a non-intrusive manner with matching lighting and/or renders the image in the same location throughout the video.

Identifying Suitable Placement Locations

In certain embodiments, a VPP service (e.g., pipeline) is to identify suitable placement locations, e.g., via empty space identification service 146C. In certain embodiments, a VPP machine learning (ML) model is to identify suitable placement locations for 2D objects (e.g., posters, product images, etc.) on a wall. In certain embodiments, the input to the model is an image/video frame from a video (e.g., a cooking show) and the output will be a list of (e.g., the best) locations to the place the 2D object in the image. In certain embodiments, the best location to place the product is the one that looks the most realistic. For example, a can or other vessel placed on a counter or other surface and not just stuck to a wall. Suitable placement locations can be on other (e.g., kitchen) objects as well, for example, the microwave, oven, refrigerator, etc.

In certain embodiments, an ML model for identification of suitable placement location(s) can be (i) a rule-based approach using pre-trained models, or (ii) a custom model on (e.g., a content provider's) annotated data.

(i) Rule Based Wall Segmentation Approach

In certain embodiments, a rule-based approach includes one or more of the following for identification of a suitable location.

Wall detection: detects a wall in a video frame using a panoptic segmentation model (e.g., pre-trained on a dataset and filtered on "wall" classes of objects.

Figure 4:
FIG. 4 illustrates an example image (e.g., frame) with a flat object (e.g., wall) detected according to some embodiments.

FIG. 4 illustrates an example image 400 (e.g., frame) with a flat object 402 (e.g., wall) detected according to some embodiments.

Plane detection: detects distinct planar surfaces in a video frame using a plane detection model.

Figure 5:
FIG. 5 illustrates an example image (e.g., frame) with a plurality of distinct planar surfaces detected according to some embodiments.

FIG. 5 illustrates an example image 500 (e.g., frame) with a plurality of distinct planar surfaces (502, 504) detected according to some embodiments.

Generate mask: generates an empty space mask using the intersection (e.g., overlap) of the results from a wall segmentation model and a plane detection model.

Figure 6:
FIG. 6 illustrates an example image (e.g., frame) combining the flat object of FIG. 4 and the plurality of distinct planar surfaces of FIG. 5 to generate empty space masks according to some embodiments.

FIG. 6 illustrates an example image 600 (e.g., frame) combining the flat object 402 of FIG. 4 and the plurality of distinct planar surfaces (502, 504) of FIG. 5 to generate empty space masks (602, 604) according to some embodiments.

Finding region proposals from mask: in certain embodiments, segmentation models and/or mask do not have the information to distinguish different sections (e.g., "blobs") which may not be a quadrilateral) in the mask, and thus use a region proposal function to get region proposals (e.g., a (e.g., quadrilateral) bounding box for each section (e.g., blob).

Figure 7:
FIG. 7 illustrates an example image (e.g., frame) with a plurality of candidate regions generated from the empty space masks of FIG. 6 according to some embodiments.

FIG. 7 illustrates an example image 700 (e.g., frame) with a plurality of candidate regions (702, 704) (shown with a red outline) generated from the empty space masks of FIG. 6 (respectively) according to some embodiments.

In certain embodiments, the above-mentioned parts of a rule-based pipeline return suitable placement locations (e.g., regions) in an image but these locations (e.g., regions) may not be prospectively aligned. In certain embodiments, the following sub module aligns an already identified suitable region in an image.

Aligning the bounding box: certain embodiments herein utilize a line detection model (e.g., Line Segment Detection Using Transformers without Edges (LETR)) for aligning a region. In certain embodiments, region alignment includes:

Running the line detection model on an a (e.g., raw) image (or video frame) to generate lines.

Figure 8:
FIG. 8 illustrates an example image (e.g., frame) with a plurality of lines generated from a line (e.g., segment) detection model according to some embodiments.

FIG. 8 illustrates an example image 800 (e.g., frame) with a plurality of (horizontal, vertical, etc.) lines (shown as orange) generated from a line (e.g., segment) detection model according to some embodiments.

In certain embodiments, the lines are classified (e.g., filtered) as vertical (e.g., substantially vertical) and horizontal (e.g., substantially horizontal) by measuring a threshold difference between "X" and "Y" co-ordinates of a Cartesian coordinate system. In certain embodiments, the threshold is a hyper-parameter.

Figure 9:
FIG. 9 illustrates an example image (e.g., frame) with a plurality of only horizontal lines generated from a line (e.g., segment) detection model according to some embodiments.

FIG. 9 illustrates an example image 900 (e.g., frame) with a plurality of only horizontal lines generated from a line (e.g., segment) detection model according to some embodiments.

Figure 10:
FIG. 10 illustrates an example image (e.g., frame) with a plurality of only vertical lines generated from a line (e.g., segment) detection model according to some embodiments.

FIG. 10 illustrates an example image 1000 (e.g., frame) with a plurality of only vertical lines generated from a line (e.g., segment) detection model according to some embodiments.

In certain embodiments, to align the (e.g., candidate) region to wall line segment(s), the closest vertical and/or horizontal lines are found. There are multiple ways of computing a distance between a region and a line segment. In certain embodiments, the distance between the center of the region and the endpoints on the line segment is generated, and the pair with the minimum distance is selected.

Figure 11:
FIG. 11 illustrates an example image (e.g., frame) with a candidate (e.g., empty) surface for insertion of secondary content (e.g., a two-dimensional image of a virtual product) and a closest line to, and skewed from, the candidate surface according to some embodiments.

FIG. 11 illustrates an example image 1100 (e.g., frame) with a candidate (e.g., empty) surface 1104 for insertion of secondary content (e.g., a two-dimensional image of a virtual product) and a closest (e.g., horizontal) line 1102 to, and skewed from, the candidate surface according to some embodiments.

In certain embodiments, the rule based wall segmentation includes computing adjusted region points with slope of the line segments. Given that a point (x1, y1) is at distance d away from (x, y), embodiments herein generate x1 and y1 co-ordinates using the following formulae.

$$r = \sqrt{1 + m^2}$$

$$(x_1, y_1) = \left(x + \frac{d}{r}, y + \frac{d \cdot m}{r}\right)$$

Figure 12:
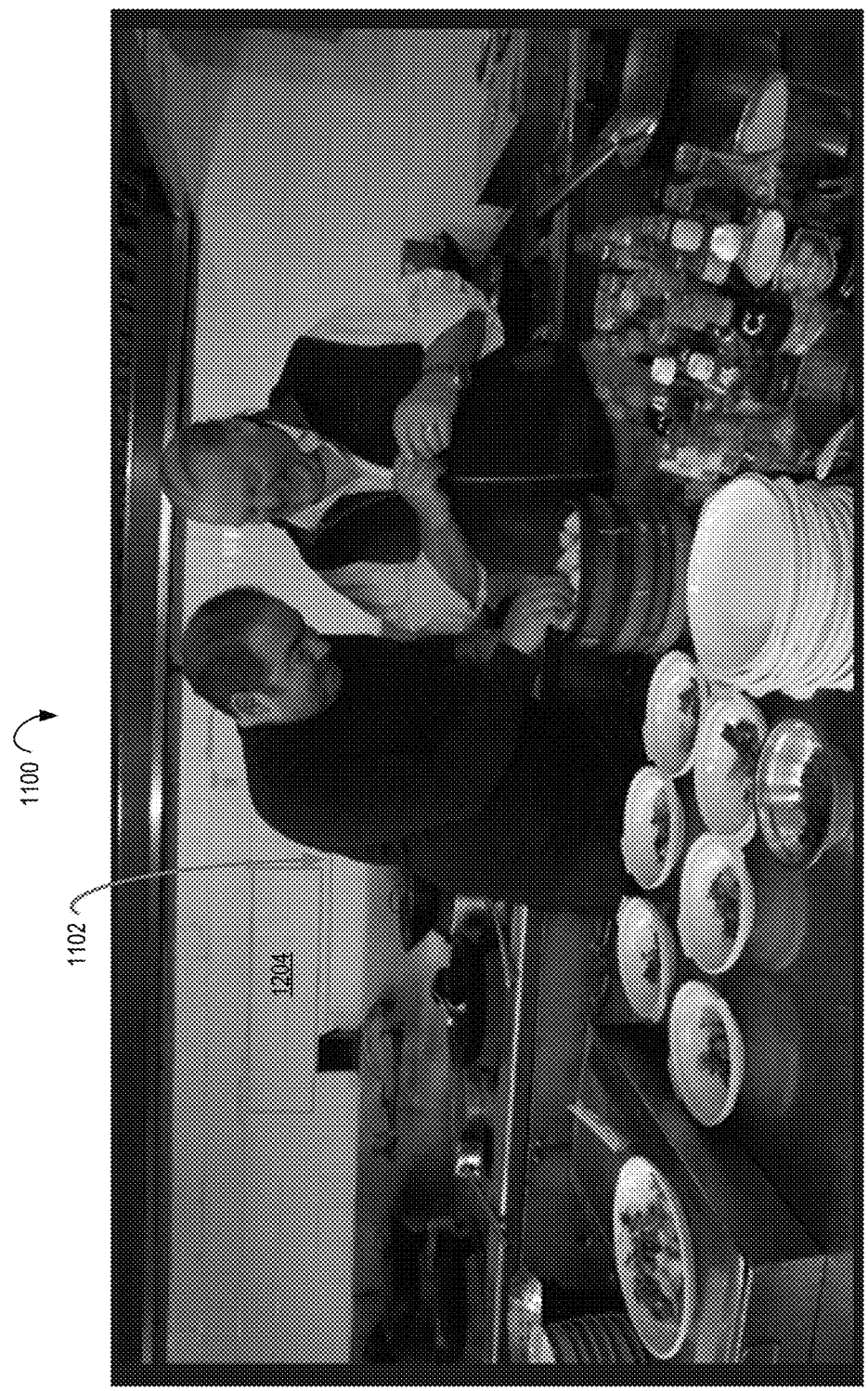
FIG. 12 illustrates an example image (e.g., frame) with the candidate (e.g., empty) surface for insertion of secondary content (e.g., a two-dimensional image of a virtual product) skewed according to the skew of the closest line from FIG. 11 according to some embodiments.

FIG. 12 illustrates an example image 1100 (e.g., frame) with the candidate (e.g., empty) surface 1204 for insertion of secondary content (e.g., a two-dimensional image of a virtual product) skewed (e.g., such that bottom line of the surface 1204 (e.g., rectangle) is parallel to line 1102) according to the skew of the closest line 1102 from FIG. 11 according to some embodiments. For example, a skew of the surface as depicted in the video relative to a camera that captured the video.

(ii) Custom Modeling Approach for Identifying Suitable Location

Certain embodiments herein utilize a single custom model, e.g., in contrast to a rule based approach utilizing an ensemble of three different models.

Data Annotation: in certain embodiments, the precursor for a custom modeling approach is an annotated dataset. In certain embodiments (e.g., for a cooking show), the video frames/images were labeled using the following mechanism: an image was labeled if it had of a kitchen scene with empty space on walls and had the presence of a person in full view, an image was not labeled/discarded if it was a close up of a cooking scene, a non-kitchen scene, or the scene did not have any empty space on the wall, and/or an empty space was labeled using a polygon based bounding box (e.g., with 2-3 large empty spaces marked for each image).

Figure 13:
FIG. 13 illustrates an example training image (e.g., frame) with a plurality of candidate (e.g., empty) surfaces for insertion of secondary content (e.g., a two-dimensional image of a virtual product) according to some embodiments.

FIG. 13 illustrates an example training image 1300 (e.g., frame) with a plurality of candidate (e.g., empty) surfaces (1302, 1304, 1306) for insertion of secondary content (e.g., a two-dimensional image of a virtual product) according to some embodiments.

In certain embodiments, the annotated training data is augmented using one or more of the following augmentation techniques: Gaussian noise, optical distortion, channel shuffle, and/or random cropping.

Figure 14:
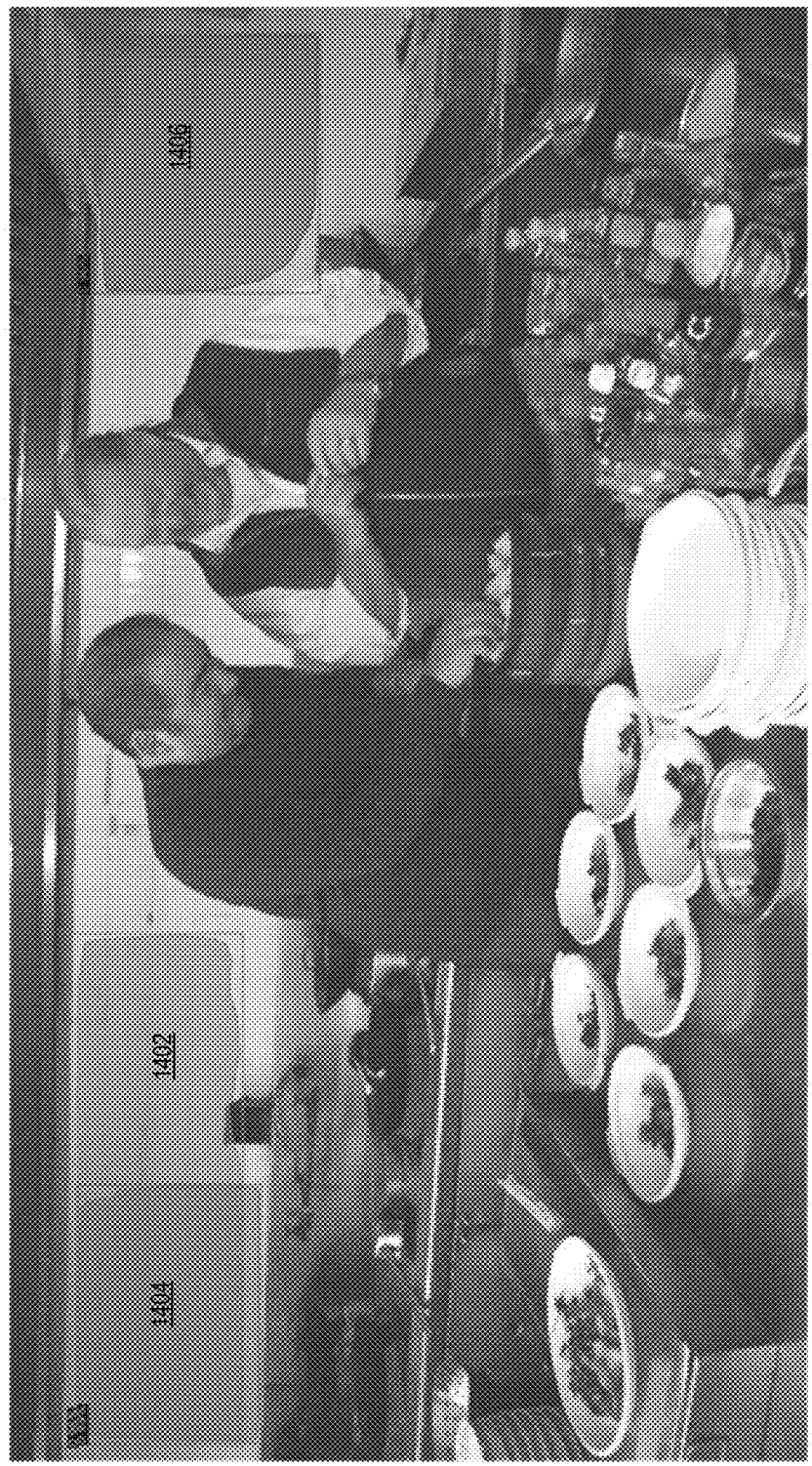
FIG. 14 illustrates an example augmented training image (e.g., frame) augmented with channel shuffle and noise according to some embodiments.

FIG. 14 illustrates an example augmented training image 1400 (e.g., frame) augmented with channel shuffle and noise according to some embodiments. FIG. 14 further includes a plurality of candidate (e.g., empty) surfaces (1402, 1404, 1406) (for example, along with their respective candidate scores (e.g., between 0 and 1) (e.g., representing the confidence that a surface is on a wall and the wall is empty there)) for insertion of secondary content (e.g., a two-dimensional image of a virtual product).

Figure 15:
FIG. 15 illustrates an example augmented training image (e.g., frame) augmented with channel shuffle and noise according to some embodiments.

FIG. 15 illustrates an example augmented training image 1500 (e.g., frame) augmented with channel shuffle and noise according to some embodiments. FIG. 15 further includes a plurality of candidate (e.g., empty) surfaces (1502, 1504, 1506) (for example, along with their respective candidate scores (e.g., between 0 and 1) (e.g., representing the confidence that a surface is on a wall and the wall is empty there)) for insertion of secondary content (e.g., a two-dimensional image of a virtual product).

Modeling Approach

Certain embodiments herein build a custom model for identifying suitable locations: using (i) polygon bounding box regression or (ii) instance segmentation.

Polygon Bounding Box Regression: certain embodiments regress the points of a polygon to predict a perspective aligned bounding box (e.g., a Yolov5 model).

Figure 16:
FIG. 16 illustrates an example image (e.g., frame) with a plurality of candidate (e.g., empty) surfaces for insertion of secondary content (e.g., a two-dimensional image of a virtual product) generated by another machine learning model according to some embodiments.

FIG. 16 illustrates an example image 1600 (e.g., frame) with a plurality of candidate (e.g., empty) surfaces (1602, 1604, 1606) for insertion of secondary content (e.g., a two-dimensional image of a virtual product) generated by another machine learning model (e.g., a polygon bounding box regression model) according to some embodiments.

Instance Segmentation: certain embodiments identify a patch/segment on wall for content (e.g., ad) placement (e.g., a Mask-Region-Based Convolutional Neural Network (RCNN) model).

Figure 17:
FIG. 17 illustrates an example image (e.g., frame) with a plurality of candidate (e.g., empty) surfaces for insertion of secondary content (e.g., a two-dimensional image of a virtual product) generated by yet another machine learning model according to some embodiments.

FIG. 17 illustrates an example image 1700 (e.g., frame) with a plurality of candidate (e.g., empty) surfaces (1702, 1704) for insertion of secondary content (e.g., a two-dimensional image of a virtual product) generated by yet another machine learning model (e.g., an instance segmentation model) according to some embodiments.

Certain ML models herein are trained over multiple image resolutions and/or an annotated dataset for perspective aligned predictions.

Scene (e.g., Kitchen) Detection

In certain embodiments, a VPP service (e.g., pipeline) is to identify suitable placement locations, e.g., via (e.g., kitchen) scene detection service 146A. In certain embodiments, a VPP ML model is to detect a relevant (e.g., kitchen) scene, e.g., as a sub-task of empty space identification. In certain embodiments (e.g., in addition to identifying just an empty space in an image), the VPP pipeline should also be able to discern if the frame being captured is within a (e.g., kitchen) scene, (e.g., as opposed to outdoors or other areas), and render the image accordingly.

In certain embodiments, a suitable placement location is considered in an indoor kitchen scene on a wall, e.g., such that one of the tasks is to predict whether a given frame is shot in a kitchen scene or non-kitchen scene. Embodiments herein utilize a pretrained CV models with rule-based approach to classify whether a scene is shot in a kitchen or elsewhere. Certain embodiments herein define a scene as "kitchen scene" when a person is clearly visible, and the surrounding area has kitchen related artifacts.

Certain embodiments herein define a positive classification of kitchen scene when a person is detected with a confidence of a first threshold (e.g., 90%) or above and the image contains kitchen artifacts (e.g., 'bottle', 'wine glass', 'cup', 'fork', 'knife', 'spoon', and/or 'bowl') with a confidence of a second threshold (e.g., 80%) or above. In certain embodiments, the first threshold filters out scenarios when the camera focuses on cooking pan or close up of a region in the kitchen when the person could be partially visible or completely out of scene. In certain embodiments, the second threshold for kitchen artifacts is decided based on qualitative evaluation.

In certain embodiments, a scene (e.g., kitchen) detection ML model is trained on a dataset where images e marked an empty space box or marked a kitchen scene with no empty space tag were considered positive classes, e.g., and the rest of the images were marked as negative class.

Occlusion Handling

In certain embodiments, a VPP service (e.g., pipeline) is to handle occlusion of certain objects that are not to be placed "behind" the virtual product, e.g., via occlusion handling service 146B. In certain embodiments, a VPP ML model is to occlude (e.g., hide) a placed (e.g., and scaled) virtual object if it is blocked by other virtual or real-world objects. Certain embodiments herein utilize a computer vision model that generates a segmentation map of objects, e.g., where the model takes a video frame as input and outputs (e.g., a foreground and/or background) binary map that will be used to discern visible pixels of the virtual object from those parts of the object that should be occluded by the foreground objects. In certain embodiments, the occlusion handling model is an image segmentation model, e.g., (i) semantic segmentation model, (ii) Instance segmentation model, or (iii) Panoptic segmentation model.

(i) Semantic Segmentation

In certain embodiments, a semantic segmentation model classifies pixels in an image into semantic classes, e.g., pixels belonging to a particular class are simply classified to that class with no other information or context taken into consideration.

(ii) Instance Segmentation

In certain embodiments, an instance segmentation model classifies pixels into categories on the basis of "instances" rather than classes, e.g., such that the instance segmentation model has no idea of the class a classified region belongs to but can segregate overlapping or similar object regions on the basis of their boundaries.

(iii) Panoptic Segmentation

In certain embodiments, a panoptic segmentation model is expressed as the combination of semantic segmentation and instance segmentation where each instance of an object in the image is segregated, and the object's identity is predicted.

Ambient Light Rendering

In certain embodiments, a VPP service (e.g., pipeline) is to handle ambient light rendering of the virtual product, e.g., via ambient light rendering service 146D. In certain embodiments, a VPP ML model is to match the light (e.g., perception of lighting) of an advertisement image (e.g., virtual product) to the background image it is to be inserted onto. In certain embodiments, the ambient light rendering service is to perform (i) color transfer, (ii) histogram matching, (iii) image brightness matching, or (iv) light transfer.

Figure 18:
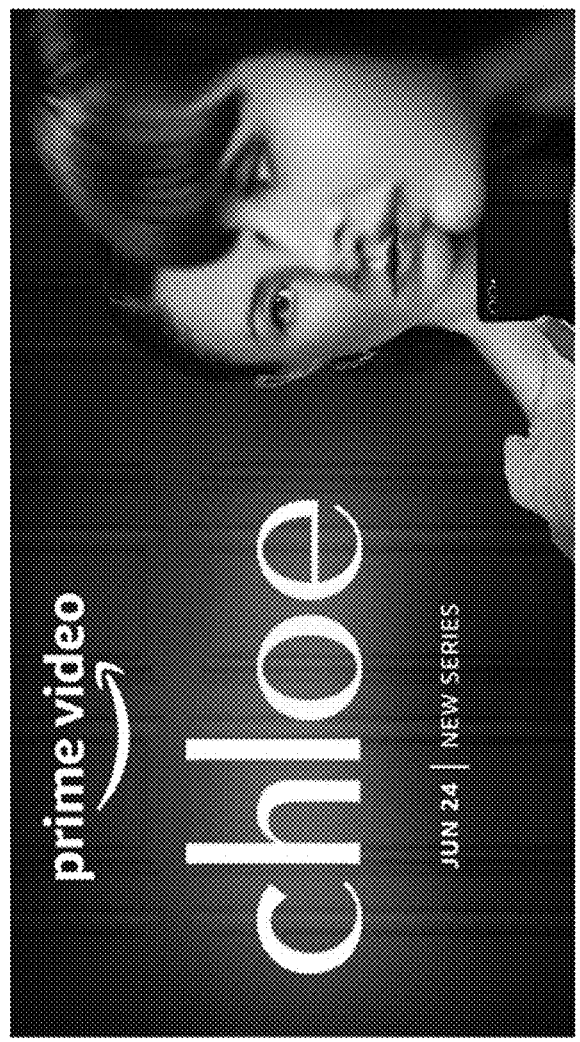
FIG. 18 illustrates an example image of secondary content (e.g., a two-dimensional image) according to some embodiments.
Figure 19:
FIG. 19 illustrates an example image (e.g., frame) for insertion of the secondary content of FIG. 18 according to some embodiments.

FIG. 18 illustrates an example image of secondary content 1800 (e.g., a two-dimensional image) (e.g., an advertisement for a TV series) according to some embodiments. FIG. 19 illustrates an example image 1900 (e.g., frame) for insertion of the secondary content of FIG. 18 according to some embodiments.

(i) Color Transfer

In certain embodiments of color transfer, the background image's color is attempted to be transferred to the advertisement image (e.g., virtual product). In certain embodiments, this method uses statistical analysis to impose one image's color characteristics on another, e.g., to achieve color correction by choosing an appropriate source image and apply its characteristic to another image. In certain embodiments, this method utilizes the "Lab" color space standard defined by the International Commission on Illumination (CIE), and the mean and standard deviation of each of the lightness (L) (e.g., on a scale of black at zero and white at one hundred), a channel (e.g., relative to the green-red opponent colors, with negative values toward green and positive values toward red), and b channel (e.g., relative to the blue-yellow opponent colors, with negative numbers toward blue and positive toward yellow), respectively, that the color can be transferred between two images.

Figure 20:
FIG. 20 illustrates an example image (e.g., frame) with the secondary content of FIG. 18 inserted and light matching by color transfer according to some embodiments.

FIG. 20 illustrates an example image 2000 (e.g., frame) with the secondary content 1800A of FIG. 18 inserted and light matching by color transfer according to some embodiments.

(ii) Histogram Matching

In certain embodiments of histogram matching, the advertisement image's histogram is attempted to be matched to the background image, e.g., using a histogram equalization method. In certain embodiments, the algorithm starts by finding a set of unique pixel values and their corresponding indices and counts, then it takes the cumulative sum of the counts and normalizes by the number of pixels to get the empirical cumulative distribution function for the background and secondary content (e.g., ad image).

Figure 21:
FIG. 21 illustrates an example image (e.g., frame) with the secondary content of FIG. 18 inserted and light matching by histogram matching according to some embodiments.

FIG. 21 illustrates an example image 2100 (e.g., frame) with the secondary content 1800B of FIG. 18 inserted and light matching by histogram matching according to some embodiments.

(iii) Image Brightness Matching

In certain embodiments of image brightness matching, the brightness of the advertisement image is attempted to be matched to the background image. In certain embodiments, this includes, first, calculating the brightness of the background image and then adjusting the brightness of the secondary content (e.g., ad image) to match that value. For example:

$$g(x) = \alpha * f(x) + \beta$$

Where g (x) represents the (e.g., desired) brightness of the secondary content (e.g., ad image), from an input of f(x) that represents the brightness of the background image (e.g., frame), a being the gain (or contrast), and being the bias (or brightness).

Figure 22:
FIG. 22 illustrates an example image (e.g., frame) with the secondary content of FIG. 18 inserted and light matching by brightness matching according to some embodiments.

FIG. 22 illustrates an example image 2200 (e.g., frame) with the secondary content 1800C of FIG. 18 inserted and light matching by brightness matching according to some embodiments.

(iv) Light Transfer

In certain embodiments of (e.g., Lab) light transfer, the background image's light (e.g., in LAB format) is attempted to be transferred to the advertisement image. In certain embodiments, a difference between this method and "Color Transfer" method presented above is that this method a and b channels do not change and only L channel will be transferred.

Figure 23:
FIG. 23 illustrates an example image (e.g., frame) with the secondary content of FIG. 18 inserted and light matching by light transfer according to some embodiments.

FIG. 23 illustrates an example image 2300 (e.g., frame) with the secondary content 1800D of FIG. 18 inserted and light matching by light transfer according to some embodiments.

Virtual Product Overlay (e.g., Ad placement)

In certain embodiments, a VPP service (e.g., pipeline) is to place the virtual product (e.g., or other ad image) in the video, e.g., given its location coordinates and/or segmentation maps of occluding objects, e.g., via virtual product overlay service 146F. In certain embodiments, a VPP ML model is a computer vision model that places virtual product (e.g., or other ad image) on to the video frame. In certain embodiments, the model would take as inputs: a video frame, identified empty space location, human segmentation binary-map, and virtual product (e.g., or other ad image) that has been adjust for ambient light, and outputs a video frame(s) with virtual product (e.g., or other ad image) rendered (e.g., occlusion and light handled).

Modeling Approach

In addition to the binary map of human segmentation and ambiently lit virtual product image (e.g., or other ad image), certain embodiments herein use a perspective transform function to learn the transform from virtual product image (e.g., or other ad image) to the placement location on the image. In certain embodiments, the learnt transformation matrix will warp the virtual product image (e.g., or other ad image) according to the empty space location dimensions. In certain embodiments, before rendering the image, those regions of the virtual product image (e.g., or other ad image) that are occluded by humans in the scene are masked out (e.g., using segmentation maps).

In certain embodiments, virtual product image (e.g., or other ad image) placement includes: placing the virtual product image (e.g., or other ad image) accurately, occluding the virtual product image (e.g., or other ad image) from objects that are in line of view, and rendering with quality resolution.

Ad Tracking

In certain embodiments, a VPP service (e.g., pipeline) is to track the virtual product image (e.g., or other ad image) in a video for consistent and realistic rendering in the same location, e.g., via image matching service 146E. In certain embodiments, a VPP ML model tracks the location of virtual product image (e.g., or other ad image) in consecutive frames given previous video frame and its location coordinates. In certain embodiments, this assumes that the camera parameters are unknown, e.g., and unable to determine a 3D world to a 2D video frame mapping.

In certain embodiments, tracking the location of virtual product image (e.g., or other ad image) in consequent frames consists of one or more of the following tasks: mask out occluding objects (e.g., humans) in image (refer to Occlusion task from above), detection and description of image features (e.g., this involves understanding key features in an image and generating a feature-vector/embedding, remove features in and around occluding items (e.g., humans) (e.g., this is done so that the tracking is based on the objects and features from surrounding than the human features), feature matching (e.g., this involves matching the features generated in both the images for correspondence), outlier detection (e.g., this involves removing the outliers in feature matchings using thresholds on "matching" metric), learn the homography matrix (e.g., This involves learning the transformation matrix (e.g., approximation of mild camera movement) between previous and current image), and get location coordinates (e.g., this involves applying the transformation on previous image virtual product image (e.g., or other ad image) location coordinates to get new location coordinates for current image).

Feature Matching

In certain embodiments, feature matching tends to pick on human features (e.g., attire, body parts) than the background artifacts. Masking them reduces the number of matches, however, it leads to accurate matching around background artifacts, which are mostly immovable compared to humans. In certain embodiments, the number of features matched from simple to complex background increases which in turn improves the tracking pipeline and makes the rendered object almost static with camera movement.

In certain embodiments, homography estimation-based tracking (e.g., via image matching service 146E) is an approximation for small camera movements, e.g., sudden camera movements will lead to distortion in rendering. In certain embodiments, effective of tracking is also based on the number of feature matches between two consecutive images. In certain embodiments, homography based tracking is used for static camera settings or in settings where the location of object is fixed and has visible markers (e.g., like the 4 corners of goal post in a football game). In certain embodiments, tracking based on 3D world to 2D understanding using camera calibration is utilized, e.g., without the use of multi-step pipeline.

Machine Learning Model Pipeline

In certain embodiments, a VPP service includes a machine learning pipeline, e.g., to place the virtual product image (e.g., or other ad image) in a video for consistent and realistic rendering, e.g., via virtual product rendering service 146G. In certain embodiments, a VPP ML model accepts images as parameters and outputs images as well. In other embodiments, a VPP model accepts passing paths or image attributes rather than actual images.

Figure 24:
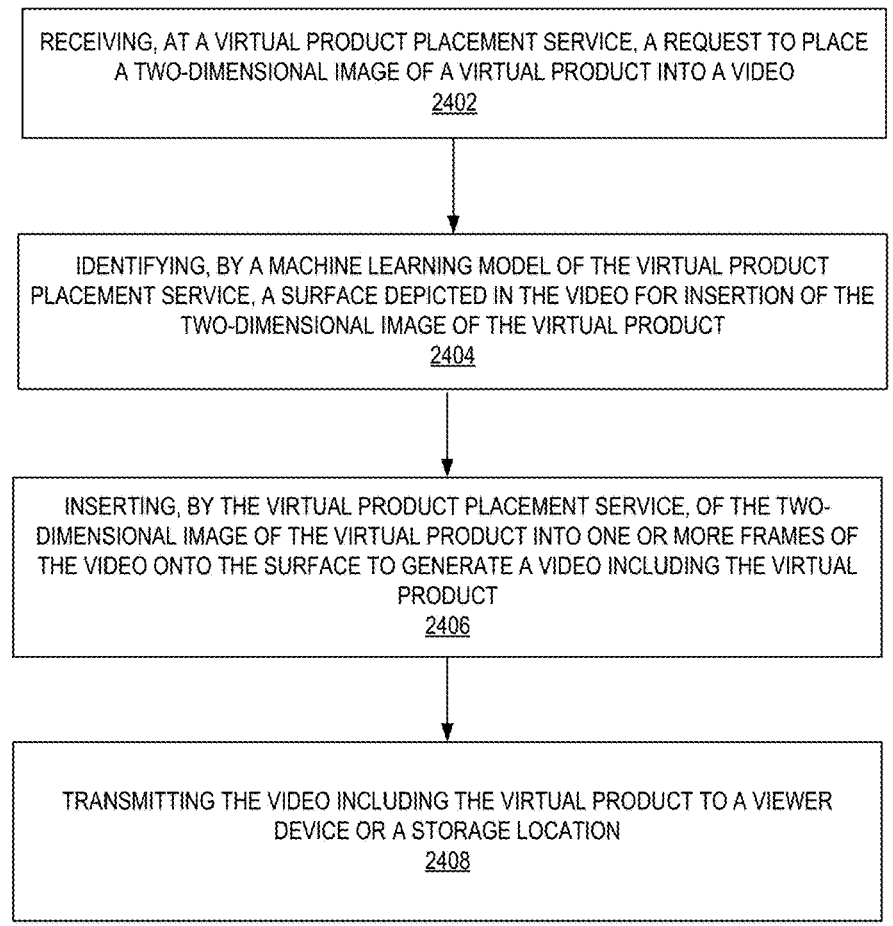
FIG. 24 is a flow diagram illustrating operations of a method of inserting a two-dimensional image of a virtual product into one or more frames of a video based at least in part on a surface in the one or more frames that is identified by a machine learning model (e.g., a VPP model) according to some embodiments.

FIG. 24 is a flow diagram illustrating operations of a method of inserting a two-dimensional image of a virtual product into one or more frames of a video based at least in part on a surface in the one or more frames that is identified by a machine learning model (e.g., a VPP model) according to some embodiments. Some or all of the operations 2400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 2400 are performed by content delivery system 102 (e.g., implemented in a provider network) of the other figures.

The operations 2400 include, at block 2402, receiving, at a virtual product placement service, a request to place a two-dimensional image of a virtual product into a video. The operations 2400 further include, at block 2404, identifying, by a machine learning model of the virtual product placement service, a surface depicted in the video for insertion of the two-dimensional image of the virtual product. The operations 2400 further include, at block 2406, inserting, by the virtual product placement service, of the two-dimensional image of the virtual product into one or more frames of the video onto the surface to generate a video including the virtual product. The operations 2400 further include, at block 2408, transmitting the video including the virtual product to a viewer device or a storage location.

Exemplary environments, systems, etc. that the above may be used in are detailed below.

At least some embodiments of the disclosed technologies can be described in view of the following examples:

Example 1. A computer-implemented method comprising:
  receiving, at a virtual product placement service, a request to place a two-dimensional image of a virtual product into a video;
  identifying, by a machine learning model of the virtual product placement service, a planar surface depicted in the video for insertion of the two-dimensional image of the virtual product;
  inserting, by the virtual product placement service, of the two-dimensional image of the virtual product into a plurality of frames of the video onto the planar surface to generate a video including the virtual product; and
  transmitting the video including the virtual product to a viewer device or a storage location.

Example 2. The computer-implemented method of example 1, wherein at least the inserting comprises:
  performing line detection on the video to determine an amount of skew of the planar surface relative to a camera that captured the video; and aligning the two-dimensional image of the virtual product to the planar surface based at least in part on the amount of skew.

Example 3. The computer-implemented method of example 1, further comprising, before the inserting, matching a perceived ambient light of the two-dimensional image of the virtual product to a perceived ambient light of the planar surface in the video.

Example 4. A computer-implemented method comprising:
  receiving, at a virtual product placement service, a request to place a two-dimensional image of a virtual product into a video;
  identifying, by a machine learning model of the virtual product placement service, a surface depicted in the video for insertion of the two-dimensional image of the virtual product;
  inserting, by the virtual product placement service, of the two-dimensional image of the virtual product into one or more frames of the video onto the surface to generate a video including the virtual product; and
  transmitting the video including the virtual product to a viewer device or a storage location.

Example 5. The computer-implemented method of example 4, wherein at least the inserting comprises:
  performing line detection on the video to determine an amount of skew of the surface relative to a camera that captured the video; and
  aligning the two-dimensional image of the virtual product to the surface based at least in part on the amount of skew.

Example 6. The computer-implemented method of example 4, further comprising:
  detecting, by the machine learning model of the virtual product placement service, one or more flat objects within the one or more frames of the video; and
  detecting, by the machine learning model of the virtual product placement service, one or more distinct planar surfaces within the one or more frames of the video, wherein the identifying, by the machine learning model of the virtual product placement service, of the surface for insertion of the two-dimensional image of the virtual product is based on the one or more flat objects and the one or more distinct planar surfaces.

Example 7. The computer-implemented method of example 6, further comprising generating an empty space mask based on the one or more flat objects and the one or more distinct planar surfaces, wherein the identifying, by the machine learning model of the virtual product placement service, of the surface for insertion of the two-dimensional image of the virtual product is based on the empty space mask.

Example 8. The computer-implemented method of example 7, wherein at least the inserting comprises:
performing line detection on the video to determine an amount of skew of the surface relative to a camera that captured the video; and
aligning the two-dimensional image of the virtual product to the surface based at least in part on the amount of skew.

Example 9. The computer-implemented method of example 6, wherein the detecting, by the machine learning model of the virtual product placement service, of the one or more flat objects within the one or more frames of the video comprises detecting one or more walls within the one or more frames of the video.

Example 10. The computer-implemented method of example 4, further comprising, before the inserting, matching a perceived ambient light of the two-dimensional image of the virtual product to a perceived ambient light of the surface in the video.

Example 11. The computer-implemented method of example 4, further comprising:
receiving, at the virtual product placement service, a request to replace the two-dimensional image of the virtual product in the video with a different two-dimensional image of a different virtual product;
inserting, by the virtual product placement service, of the different two-dimensional image of the virtual product into the one or more frames of the video onto the surface to generate a video including the different two-dimensional image of the different virtual product; and
transmitting the video including the different two-dimensional image of the different virtual product to a viewer device or a storage location.

Example 12. The computer-implemented method of example 4, wherein the inserting comprises inserting, by the virtual product placement service, of the two-dimensional image of the virtual product into a plurality of frames of the video onto the surface in a same location throughout the video to generate a video including the virtual product.

Example 13. The computer-implemented method of example 4, wherein the inserting further comprising:
detecting movement of an object in the video that is to be in front of the surface in a proper subset of frames of the video; and
selectively occluding the two-dimensional image of the virtual product in the proper subset of the frames of the video.

Example 14. The computer-implemented method of example 4, further comprising determining the one or more frames of the video based on a relevance score, of the one or more frames, for the virtual product.

Example 15. A non-transitory computer-readable medium storing code that, when executed by a device, causes the device to perform a method comprising:
receiving a request to place a two-dimensional image of a virtual product into a video;
identifying, by a machine learning model, a surface depicted in the video for insertion of the two-dimensional image of the virtual product; and
inserting the two-dimensional image of the virtual product into one or more frames of the video onto the surface to generate a video including the virtual product.

Example 16. The non-transitory computer-readable medium of example 15, wherein at least the inserting of the method comprises:
performing line detection on the video to determine an amount of skew of the surface relative to a camera that captured the video; and
aligning the two-dimensional image of the virtual product to the surface based at least in part on the amount of skew.

Example 17. The non-transitory computer-readable medium of example 15, wherein the method further comprises, before the inserting, matching a perceived ambient light of the two-dimensional image of the virtual product to a perceived ambient light of the surface in the video.

Example 18. The non-transitory computer-readable medium of example 15, wherein the inserting of the method comprises inserting of the two-dimensional image of the virtual product into a plurality of frames of the video onto the surface in a same location throughout the video to generate a video including the virtual product.

Example 19. The non-transitory computer-readable medium of example 15, wherein the inserting of the method further comprises:
detecting movement of an object in the video that is to be in front of the surface in a proper subset of frames of the video; and
selectively occluding the two-dimensional image of the virtual product in the proper subset of the frames of the video.

Example 20. The non-transitory computer-readable medium of example 15, wherein the method further comprises determining the one or more frames of the video based on a relevance score, of the one or more frames, for the virtual product.

Figure 25:
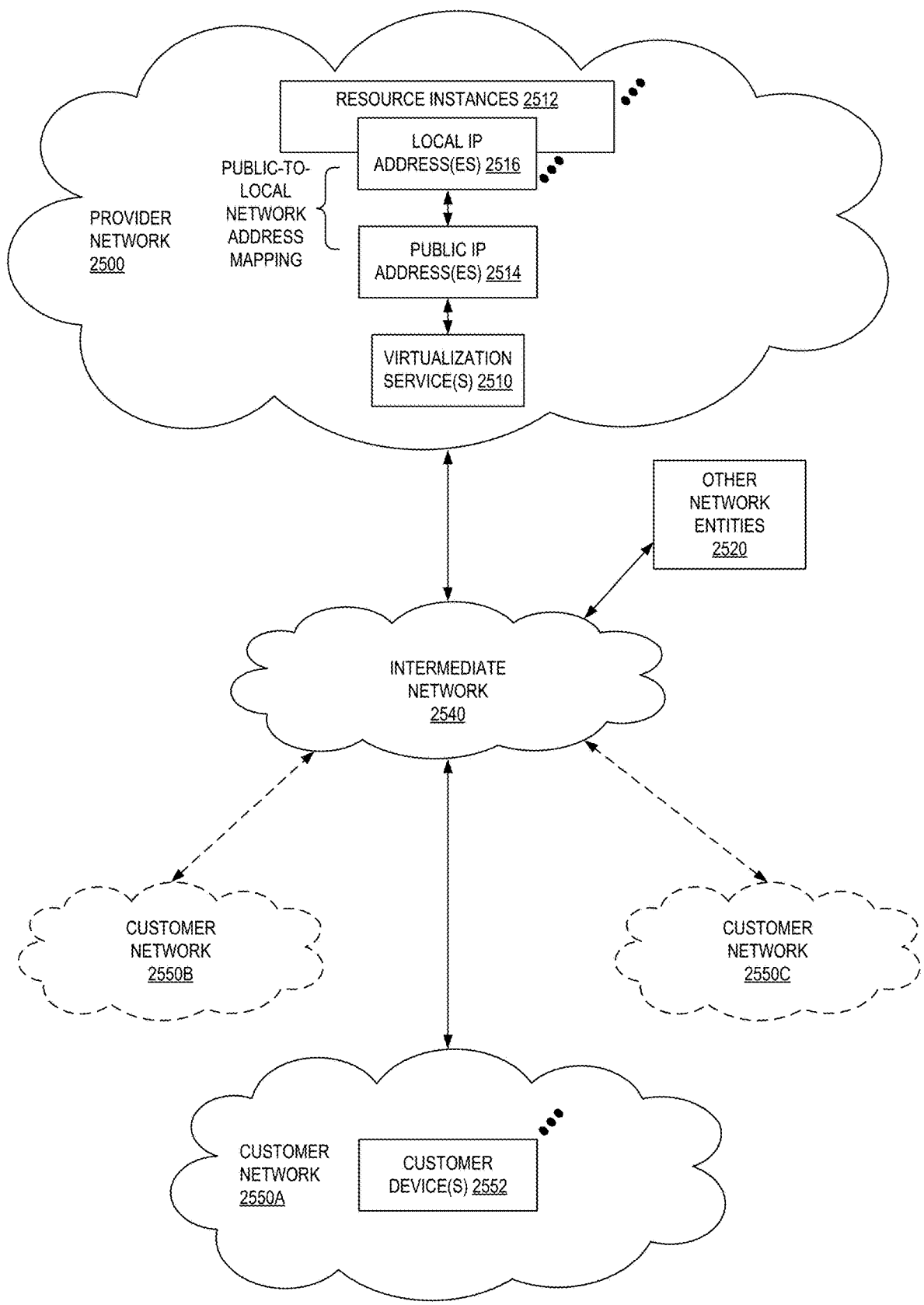
FIG. 25 illustrates an example provider network environment according to some embodiments.

FIG. 25 illustrates an example provider network (or "service provider system") environment according to some embodiments. A provider network 2500 may provide resource virtualization to customers via one or more virtualization services 2510 that allow customers to purchase, rent, or otherwise obtain instances 2512 of virtualized resources, including but not limited to computation and storage resources, implemented on devices within the provider network or networks in one or more data centers. Local Internet Protocol (IP) addresses 2516 may be associated with the resource instances 2512; the local IP addresses are the internal network addresses of the resource instances 2512 on the provider network 2500. In some embodiments, the provider network 2500 may also provide public IP addresses 2514 and/or public IP address ranges (e.g., Internet Protocol version 4 (IPv4) or Internet Protocol version 6 (IPv6) addresses) that customers may obtain from the provider 2500.

Conventionally, the provider network 2500, via the virtualization services 2510, may allow a customer of the service provider (e.g., a customer that operates one or more client networks 2550A-2550C including one or more customer device(s) 2552) to dynamically associate at least some public IP addresses 2514 assigned or allocated to the customer with particular resource instances 2512 assigned to the customer. The provider network 2500 may also allow the customer to remap a public IP address 2514, previously mapped to one virtualized computing resource instance 2512 allocated to the customer, to another virtualized computing resource instance 2512 that is also allocated to the customer.

Using the virtualized computing resource instances 2512 and public IP addresses 2514 provided by the service provider, a customer of the service provider such as the operator of customer network(s) 2550A-2550C may, for example, implement customer-specific applications and present the customer's applications on an intermediate network 2540, such as the Internet. Other network entities 2520 on the intermediate network 2540 may then generate traffic to a destination public IP address 2514 published by the customer network(s) 2550A-2550C; the traffic is routed to the service provider data center, and at the data center is routed, via a network substrate, to the local IP address 2516 of the virtualized computing resource instance 2512 currently mapped to the destination public IP address 2514. Similarly, response traffic from the virtualized computing resource instance 2512 may be routed via the network substrate back onto the intermediate network 2540 to the source entity 2520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 2500; a customer may then assign their allocated public IP addresses to particular resource instances allocated to the customer. These public IP addresses may be referred to as customer public IP addresses, or simply customer IP addresses. Instead of being assigned by the provider network 2500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 26:
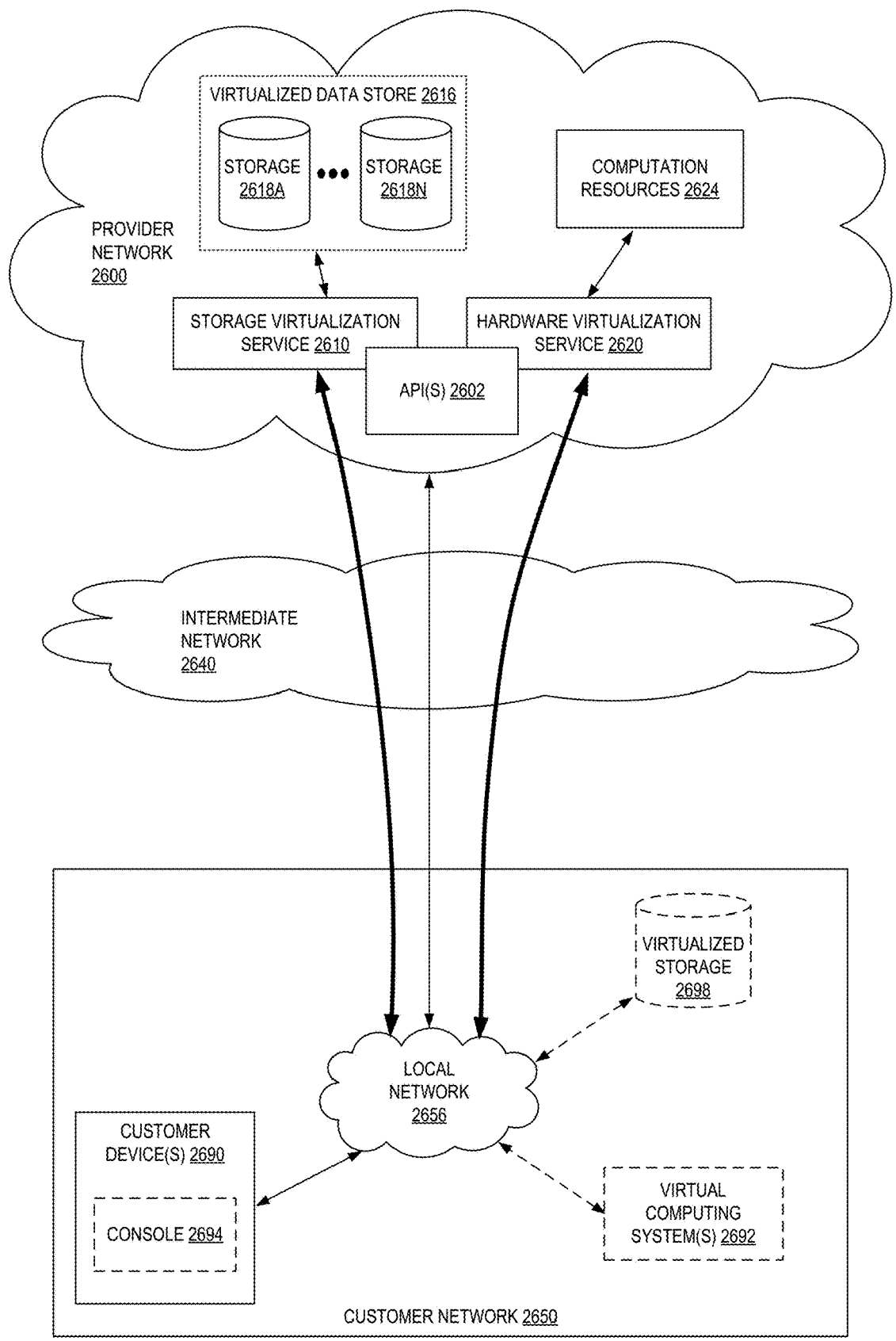
FIG. 26 is a block diagram of an example provider network that provides a storage service and a hardware virtualization service to customers according to some embodiments.

FIG. 26 is a block diagram of an example provider network that provides a storage service and a hardware virtualization service to customers, according to some embodiments. Hardware virtualization service 2620 provides multiple computation resources 2624 (e.g., VMs) to customers. The computation resources 2624 may, for example, be rented or leased to customers of the provider network 2600 (e.g., to a customer that implements customer network 2650). Each computation resource 2624 may be provided with one or more local IP addresses. Provider network 2600 may be configured to route packets from the local IP addresses of the computation resources 2624 to public Internet destinations, and from public Internet sources to the local IP addresses of computation resources 2624.

Provider network 2600 may provide a customer network 2650, for example coupled to intermediate network 2640 via local network 2656, the ability to implement virtual computing systems 2692 via hardware virtualization service 2620 coupled to intermediate network 2640 and to provider network 2600. In some embodiments, hardware virtualization service 2620 may provide one or more APIs 2602, for example a web services interface, via which a customer network 2650 may access functionality provided by the hardware virtualization service 2620, for example via a console 2694 (e.g., a web-based application, standalone application, mobile application, etc.). In some embodiments, at the provider network 2600, each virtual computing system 2692 at customer network 2650 may correspond to a computation resource 2624 that is leased, rented, or otherwise provided to customer network 2650.

From an instance of a virtual computing system 2692 and/or another customer device 2690 (e.g., via console 2694), the customer may access the functionality of storage service 2610, for example via one or more APIs 2602, to access data from and store data to storage resources 2618A-2618N of a virtual data store 2616 (e.g., a folder or "bucket", a virtualized volume, a database, etc.) provided by the provider network 2600. In some embodiments, a virtualized data store gateway (not shown) may be provided at the customer network 2650 that may locally cache at least some data, for example frequently-accessed or critical data, and that may communicate with storage service 2610 via one or more communications channels to upload new or modified data from a local cache so that the primary store of data (virtualized data store 2616) is maintained. In some embodiments, a user, via a virtual computing system 2692 and/or on another customer device 2690, may mount and access virtual data store 2616 volumes via storage service 2610 acting as a storage virtualization service, and these volumes may appear to the user as local (virtualized) storage 2698.

While not shown in FIG. 26, the virtualization service(s) may also be accessed from resource instances within the provider network 2600 via API(s) 2602. For example, a customer, appliance service provider, or other entity may access a virtualization service from within a respective virtual network on the provider network 2600 via an API 2602 to request allocation of one or more resource instances within the virtual network or within another virtual network.

Illustrative system

Figure 27:
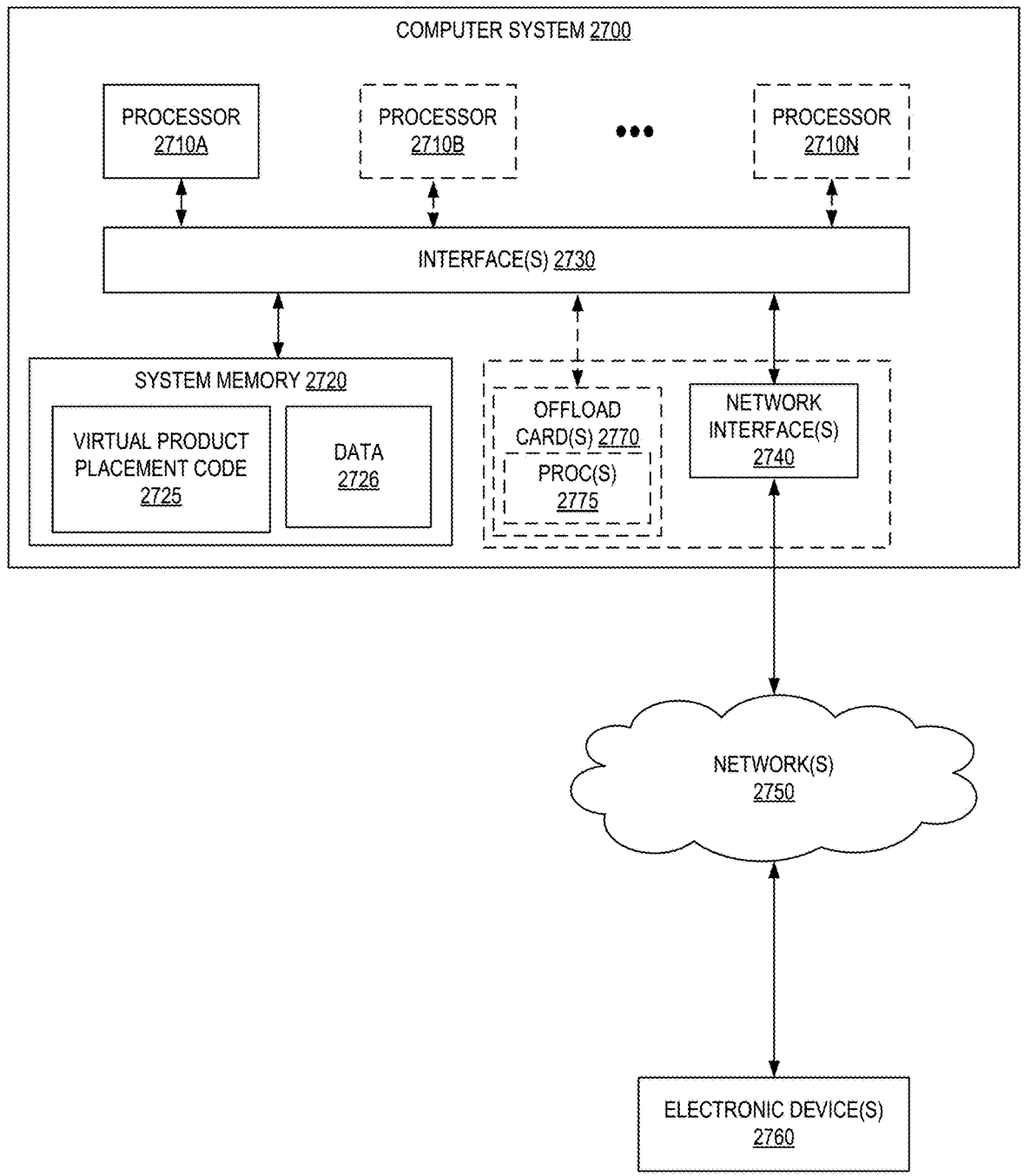
FIG. 27 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 2700 illustrated in FIG. 27. In the illustrated embodiment, computer system 2700 includes one or more processors 2710 coupled to a system memory 2720 via an input/output (I/O) interface 2730. Computer system 2700 further includes a network interface 2740 coupled to I/O interface 2730. While FIG. 27 shows computer system 2700 as a single computing device, in various embodiments a computer system 2700 may include one computing device or any number of computing devices configured to work together as a single computer system 2700.

In various embodiments, computer system 2700 may be a uniprocessor system including one processor 2710, or a multiprocessor system including several processors 2710 (e.g., two, four, eight, or another suitable number). Processors 2710 may be any suitable processors capable of executing instructions. For example, in various embodiments, processors 2710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2710 may commonly, but not necessarily, implement the same ISA.

System memory 2720 may store instructions and data accessible by processor(s) 2710. In various embodiments, system memory 2720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2720 as virtual product placement code 2725 (e.g., executable to implement, in whole or in part, the operations discussed herein) and data 2726.

In one embodiment, I/O interface 2730 may be configured to coordinate I/O traffic between processor 2710, system memory 2720, and any peripheral devices in the device, including network interface 2740 or other peripheral interfaces. In some embodiments, I/O interface 2730 may perform any necessary protocol, timing, or other data transformations to convert data signals from one component (e.g., system memory 2720) into a format suitable for use by another component (e.g., processor 2710). In some embodiments, I/O interface 2730 may include support for devices attached through various types of peripheral buses, such as a variant of the Peripheral Component Interconnect (PCI) bus standard or the Universal Serial Bus (USB) standard, for example. In some embodiments, the function of I/O interface 2730 may be split into two or more separate components, such as a north bridge and a south bridge, for example. Also, in some embodiments some or all of the functionality of I/O interface 2730, such as an interface to system memory 2720, may be incorporated directly into processor 2710.

Network interface 2740 may be configured to allow data to be exchanged between computer system 2700 and other devices 2760 attached to a network or networks 2750, such as other computer systems or devices as illustrated in FIG. 1, for example. In various embodiments, network interface 2740 may support communication via any suitable wired or wireless general data networks, such as types of Ethernet network, for example. Additionally, network interface 2740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2700 includes one or more offload cards 2770 (including one or more processors 2775, and possibly including the one or more network interfaces 2740) that are connected using an I/O interface 2730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 2700 may act as a host electronic device (e.g., operating as part of a hardware virtualization service) that hosts compute instances, and the one or more offload cards 2770 execute a virtualization manager that can manage compute instances that execute on the host electronic device. As an example, in some embodiments the offload card(s) 2770 can perform compute instance management operations such as pausing and/or un-pausing compute instances, launching and/or terminating compute instances, performing memory transfer/copying operations, etc. These management operations may, in some embodiments, be performed by the offload card(s) 2770 in coordination with a hypervisor (e.g., upon a request from a hypervisor) that is executed by the other processors 2710A-2710N of the computer system 2700. However, in some embodiments the virtualization manager implemented by the offload card(s) 2770 can accommodate requests from other entities (e.g., from compute instances themselves), and may not coordinate with (or service) any separate hypervisor.

In some embodiments, system memory 2720 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 2700 via I/O interface 2730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2700 as system memory 2720 or another type of memory. Further, a computer-accessible medium may include transmission media or signals such as electrical, electromagnetic, or digital signals, conveyed via a communication medium such as a network and/or a wireless link, such as may be implemented via network interface 2740.

Figure 28:
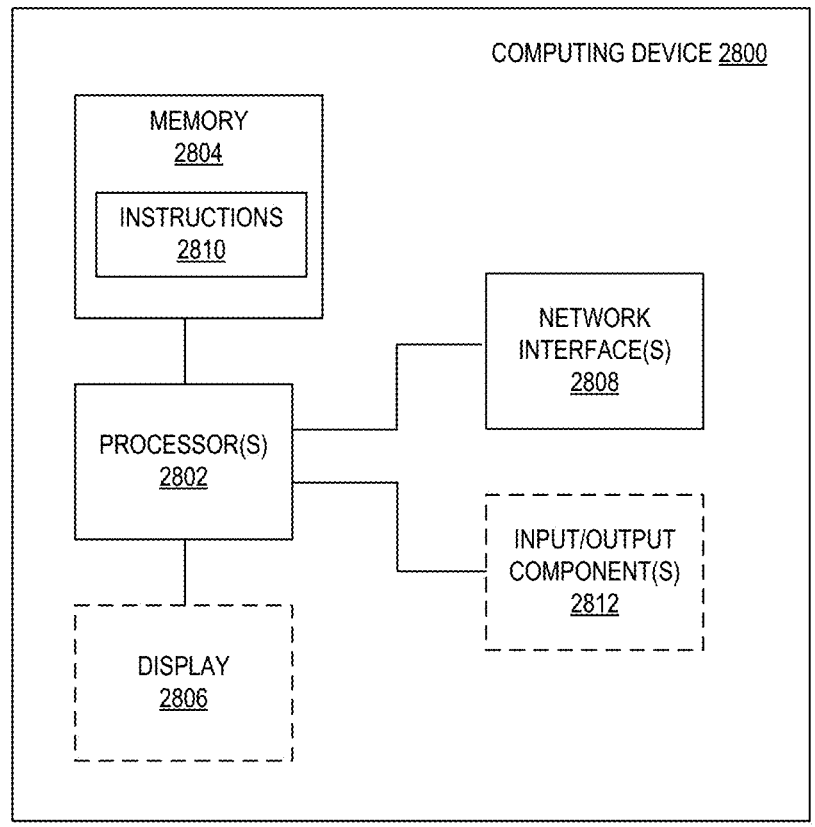
FIG. 28 illustrates a logical arrangement of a set of general components of an exemplary computing device that can be utilized in accordance with various embodiments.

FIG. 28 illustrates a logical arrangement of a set of general components of an example computing device 2800. Generally, a computing device 2800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2804) to store code (for example, instructions 2810, e.g., which implement a content delivery service as disclosed herein), and a set of one or more wired or wireless network interfaces 2808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2804) of a given electronic device typically stores code (e.g., instructions 2810) for execution on the set of one or more processors 2802 of that electronic device. One or more parts of various embodiments may be implemented using different combinations of software, firmware, and/or hardware.

A computing device 2800 can include some type of display element 2806, such as a touch screen or liquid crystal display (LCD), although many devices such as portable media players might convey information via other means, such as through audio speakers, and other types of devices such as server end stations may not have a display element 2806 at all. As discussed, some computing devices used in some embodiments include at least one input and/or output component(s) 2812 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 29:
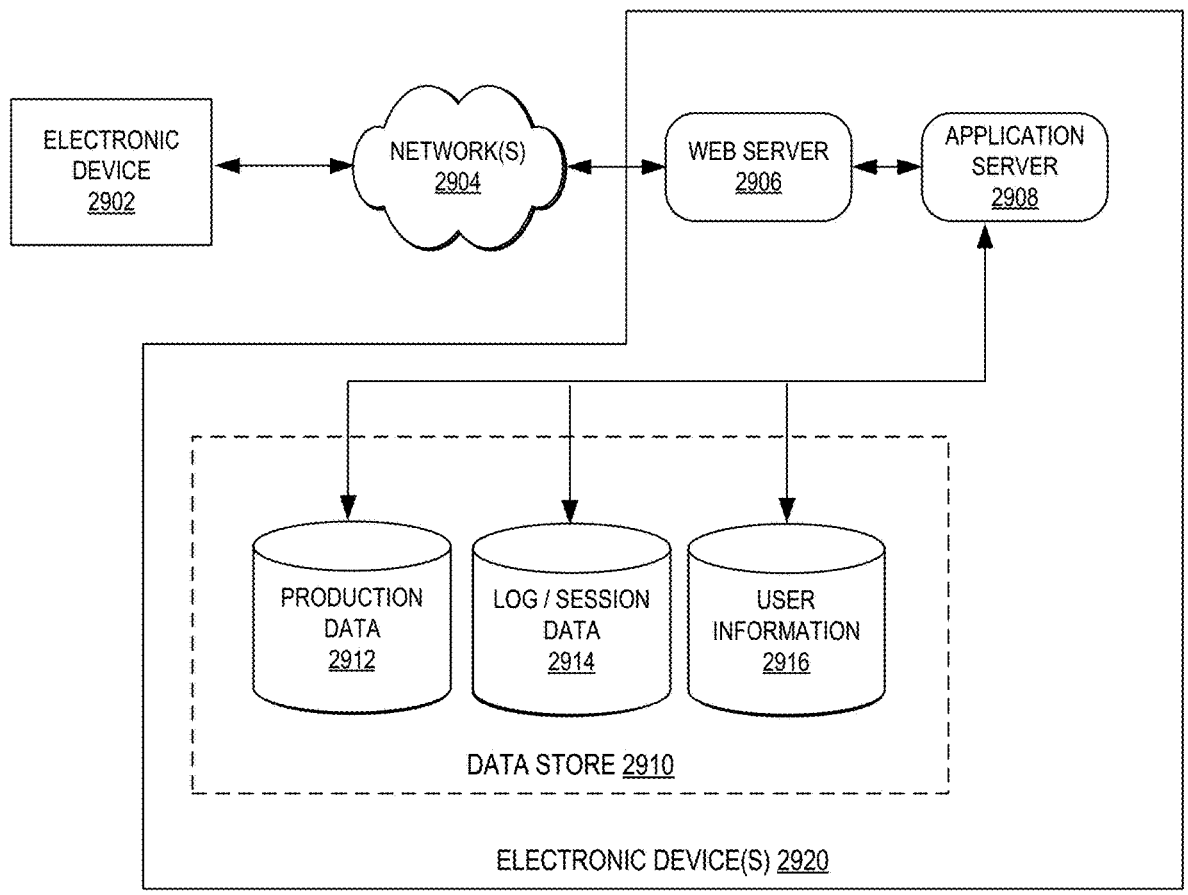
FIG. 29 illustrates an example of an environment for implementing aspects in accordance with various embodiments.

As discussed, different approaches can be implemented in various environments in accordance with the described embodiments. For example, FIG. 29 illustrates an example of an environment 2900 for implementing aspects in accordance with various embodiments. For example, in some embodiments messages are HyperText Transfer Protocol (HTTP) requests that are received by a web server (e.g., web server 2906), and the users, via electronic devices, may interact with the provider network via a web portal provided via the web server 2906 and application server 2908. As will be appreciated, although a web-based environment is used for purposes of explanation, different environments may be used, as appropriate, to implement various embodiments. The system includes an electronic client device 2902, which may also be referred to as a client device and can be any appropriate device operable to send and receive requests, messages, or information over an appropriate network 2904 and convey information back to a user of the device 2902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2904 includes the Internet, as the environment includes a web server 2906 for receiving requests and serving content in response thereto, although for other networks an alternative device serving a similar purpose could be used, as would be apparent to one of ordinary skill in the art.

The illustrative environment includes at least one application server 2908 and a data store 2910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 2908 can include any appropriate hardware and software for integrating with the data store 2910 as needed to execute aspects of one or more applications for the client device 2902 and handling a majority of the data access and business logic for an application. The application server 2908 provides access control services in cooperation with the data store 2910 and is able to generate content such as text, graphics, audio, video, etc., to be transferred to the client device 2902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2902 and the application server 2908, can be handled by the web server 2906. It should be understood that the web server 2906 and application server 2908 are not required and are merely example components, as structured code discussed herein can be executed on any appropriate device or host machine as discussed elsewhere herein.

The data store 2910 can include several separate data tables, databases, or other data storage mechanisms and media for storing data relating to a particular aspect. For example, the data store illustrated includes mechanisms for storing production data 2912 and user information 2916, which can be used to serve content for the production side. The data store 2910 also is shown to include a mechanism for storing log or session data 2914. It should be understood that there can be many other aspects that may need to be stored in the data store, such as page image information and access rights information, which can be stored in any of the above listed mechanisms as appropriate or in additional mechanisms in the data store 2910. The data store 2910 is operable, through logic associated therewith, to receive instructions from the application server 2908 and obtain, update, or otherwise process data in response thereto. In one example, a user might submit a search request for a certain type of item. In this case, the data store 2910 might access the user information 2916 to verify the identity of the user and can access a production data 2912 to obtain information about items of that type. The information can then be returned to the user, such as in a listing of results on a web page that the user is able to view via a browser on the user device 2902. Information for a particular item of interest can be viewed in a dedicated page or window of the browser.

The web server 2906, application server 2908, and/or data store 2910 may be implemented by one or more electronic devices 2920, which can also be referred to as electronic server devices or server end stations and may or may not be located in different geographic locations. Each of the one or more electronic devices 2920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 29. Thus, the depiction of the environment 2900 in FIG. 29 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 2618A-2618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a virtual product placement service, a request to place a two-dimensional image of a virtual product into a video;
   identifying, by one or more machine learning models of the virtual product placement service, a scene of the video for insertion of the two-dimensional image of the virtual product by classifying characteristics of the scene and determining a relevancy of the scene to the virtual product based on the characteristics;
   identifying, by the one or more machine learning models of the virtual product placement service, a planar surface depicted within the scene in the video for insertion of the two-dimensional image of the virtual product;
   inserting, by the virtual product placement service, the two-dimensional image of the virtual product into a plurality of frames of the video onto the planar surface to generate a video including the virtual product; and
   transmitting the video including the virtual product to a viewer device or a storage location.

2. The computer-implemented method of claim 1, wherein at least the inserting comprises:
   performing line detection on the video to determine an amount of skew of the planar surface relative to a camera that captured the video; and
   aligning the two-dimensional image of the virtual product to the planar surface based at least in part on the amount of skew.

3. The computer-implemented method of claim 1, further comprising, before the inserting, matching a perceived ambient light of the two-dimensional image of the virtual product to a perceived ambient light of the planar surface in the video.

4. A computer-implemented method comprising:
   receiving, at a virtual product placement service, a request to place a two-dimensional image of a virtual product into a video;
   identifying, by one or more machine learning models of the virtual product placement service, a scene of the video for insertion of the two-dimensional image of the virtual product by classifying characteristics of the scene and determining a relevancy of the scene to the virtual product based on the characteristics;
   identifying, by the one or more machine learning models of the virtual product placement service, a surface depicted within the scene in the video for insertion of the two-dimensional image of the virtual product;
   inserting, by the virtual product placement service, the two-dimensional image of the virtual product into one or more frames of the video onto the surface to generate a video including the virtual product; and
   transmitting the video including the virtual product to a viewer device or a storage location.

5. The computer-implemented method of claim 4, wherein at least the inserting comprises:
   performing line detection on the video to determine an amount of skew of the surface relative to a camera that captured the video; and
   aligning the two-dimensional image of the virtual product to the surface based at least in part on the amount of skew.

6. The computer-implemented method of claim 4, further comprising:
   detecting, by the one or more machine learning models of the virtual product placement service, one or more flat objects within the one or more frames of the video; and
   detecting, by the one or more machine learning models of the virtual product placement service, one or more distinct planar surfaces within the one or more frames of the video,
   wherein the identifying, by the one or more machine learning models of the virtual product placement service, of the surface for insertion of the two-dimensional image of the virtual product is based on the one or more flat objects and the one or more distinct planar surfaces.

7. The computer-implemented method of claim 6, further comprising generating an empty space mask based on the one or more flat objects and the one or more distinct planar surfaces, wherein the identifying, by the one or more machine learning models of the virtual product placement service, of the surface for insertion of the two-dimensional image of the virtual product is based on the empty space mask.

8. The computer-implemented method of claim 7, wherein at least the inserting comprises:
performing line detection on the video to determine an amount of skew of the surface relative to a camera that captured the video; and
aligning the two-dimensional image of the virtual product to the surface based at least in part on the amount of skew.

9. The computer-implemented method of claim 6, wherein the detecting, by the one or more machine learning models of the virtual product placement service, of the one or more flat objects within the one or more frames of the video comprises detecting one or more walls within the one or more frames of the video.

10. The computer-implemented method of claim 4, further comprising, before the inserting, matching a perceived ambient light of the two-dimensional image of the virtual product to a perceived ambient light of the surface in the video.

11. The computer-implemented method of claim 4, wherein the inserting comprises inserting, by the virtual product placement service, of the two-dimensional image of the virtual product into a plurality of frames of the video onto the surface in a same location throughout the video to generate a video including the virtual product.

12. The computer-implemented method of claim 4, wherein the inserting further comprises:
detecting movement of an object in the video that is to be in front of the surface in a proper subset of frames of the video; and
selectively occluding the two-dimensional image of the virtual product in the proper subset of the frames of the video.

13. The computer-implemented method of claim 4, further comprising determining the one or more frames of the video based on a relevance score, of the one or more frames, for the virtual product.

14. The computer-implemented method of claim 4, further comprising:
receiving, at the virtual product placement service, a request to replace the two-dimensional image of the virtual product in the video with a different two-dimensional image of a different virtual product;
inserting, by the virtual product placement service, of the different two-dimensional image of the virtual product into the one or more frames of the video onto the surface to generate a video including the different two-dimensional image of the different virtual product; and
transmitting the video including the different two-dimensional image of the different virtual product to a viewer device or a storage location.

15. A non-transitory computer-readable medium storing code that, when executed by a device, causes the device to perform a method comprising:
receiving a request to place a two-dimensional image of a virtual product into a video;
identifying, by one or more machine learning models, a scene of the video for insertion of the two-dimensional image of the virtual product by classifying characteristics of the scene and determining a relevancy of the scene to the virtual product based on the characteristics;
identifying, by a machine learning model, a surface depicted in the video for insertion of the two-dimensional image of the virtual product; and
inserting the two-dimensional image of the virtual product into one or more frames of the video onto the surface to generate a video including the virtual product.

16. The non-transitory computer-readable medium of claim 15, wherein at least the inserting of the method comprises:
performing line detection on the video to determine an amount of skew of the surface relative to a camera that captured the video; and
aligning the two-dimensional image of the virtual product to the surface based at least in part on the amount of skew.

17. The non-transitory computer-readable medium of claim 15, wherein the method further comprises, before the inserting, matching a perceived ambient light of the two-dimensional image of the virtual product to a perceived ambient light of the surface in the video.

18. The non-transitory computer-readable medium of claim 15, wherein the inserting of the method comprises inserting of the two-dimensional image of the virtual product into a plurality of frames of the video onto the surface in a same location throughout the video to generate a video including the virtual product.

19. The non-transitory computer-readable medium of claim 15, wherein the inserting of the method further comprises:
detecting movement of an object in the video that is to be in front of the surface in a proper subset of frames of the video; and
selectively occluding the two-dimensional image of the virtual product in the proper subset of the frames of the video.

20. The non-transitory computer-readable medium of claim 15, wherein the method further comprises determining the one or more frames of the video based on a relevance score, of the one or more frames, for the virtual product.

* * * * *